(12) United States Patent
Kitamura et al.

(10) Patent No.: US 12,272,983 B2
(45) Date of Patent: Apr. 8, 2025

(54) POWER SYSTEM, MONITORING DEVICE, INVERTER DEVICE AND PROGRAM

(71) Applicant: DAIHEN Corporation, Osaka (JP)

(72) Inventors: Takashi Kitamura, Osaka (JP); Akihiro Ohori, Osaka (JP)

(73) Assignee: DAIHEN Corporation, Osaka (JP)

( * ) Notice: Subject to any disclaimer, the term of this patent is extended or adjusted under 35 U.S.C. 154(b) by 601 days.

(21) Appl. No.: 17/694,374

(22) Filed: Mar. 14, 2022

(65) Prior Publication Data

US 2022/0294250 A1    Sep. 15, 2022

(30) Foreign Application Priority Data

Mar. 15, 2021   (JP) ................. 2021-041118
Aug. 19, 2021   (JP) ................. 2021-133891

(51) Int. Cl.
  *H02J 7/00*    (2006.01)
  *H02M 1/00*    (2006.01)
  *H02M 1/42*    (2007.01)
  *H02M 7/537*   (2006.01)

(52) U.S. Cl.
  CPC ........ *H02J 7/00712* (2020.01); *H02J 7/0013* (2013.01); *H02M 1/0012* (2021.05); *H02M 1/0067* (2021.05); *H02M 1/42* (2013.01); *H02M 7/537* (2013.01); *H02J 2207/20* (2020.01)

(58) Field of Classification Search
  CPC .. H02J 7/00712; H02J 7/0013; H02J 2207/20; H02J 3/46; H02M 1/0012; H02M 1/0067; H02M 1/42; H02M 7/537; H02M 1/32; H02M 1/36; H02M 1/0003; H02M 7/493
  See application file for complete search history.

(56) References Cited

U.S. PATENT DOCUMENTS 5,446,645 A  *  8/1995  Shirahama ................ H02J 3/46
                                                   363/55

FOREIGN PATENT DOCUMENTS

| JP | 2010-68630 A  | 3/2010 |
| JP | 2015-166901 A | 9/2015 |
| JP | 2018-121189 A | 8/2018 |

\* cited by examiner

*Primary Examiner* — Jack Chiang
*Assistant Examiner* — Brandon Bowers
(74) *Attorney, Agent, or Firm* — HSML P.C.

(57) ABSTRACT

A monitoring device includes a receiving unit receiving effective power output value and reactive power output value from inverter devices, a setting unit setting effective power target value and reactive power output value for each inverter device, a first calculation unit calculating voltage phase command value for each inverter device, a second calculation unit calculating a voltage amplitude command value for each inverter device, a transmitting unit transmitting the voltage phase command value and voltage amplitude command value to relevant inverter devices, a distribution rate calculating unit calculating a distribution rate for each inverter device, and a total value calculating unit calculating effective power total value and reactive power total value for the inverter devices. The setting unit calculates effective power target value using effective power total value and distribution rate for each inverter device, and also calculates reactive power target value using reactive power total value and distribution rate for each inverter device.

6 Claims, 11 Drawing Sheets

(a)

(b)

(c)

(d)

POWER SYSTEM, MONITORING DEVICE, INVERTER DEVICE AND PROGRAM

TECHNICAL FIELD

The present disclosure generally relates to power systems. The present disclosure also relates to a monitoring device, an inverter device, and a program used for complementing the power systems.

BACKGROUND

Recently, research on distributed power supply systems using multiple solar cells and/or storage batteries, etc., has been in progress. In general, each distributed power source (solar cell, storage battery, etc.) is connected to the power grid, and detects the phase of its voltage (grid voltage), thereby using the detected phase as its own internal phase to control power (see e.g., Patent Document 1).

A distributed power supply may fail to be connected to the power grid due to a power failure, for example, and need to operate independently or in a self-sustaining manner. In this case, the distributed power supply is not able to detect the phase of the grid voltage. Against such an inconvenience, the distributed power may be configured to oscillate a predetermined electrical signal by itself and control output voltage using the phase of this electrical signal as the internal phase.

Patent Document 1: JP-A-2010-68630
Patent Document 2: JP-A-2015-166901
Patent Document 1: JP-A-2018-121189

Conventionally, multiple distributed power sources may be connected in parallel and operated together ("parallel operation"). In this case, appropriate independent/self-sustaining operation control is required depending on the number of distributed power sources involved in the parallel operation and on the rated capacities or types of the respective distributed power sources. However, in a conventionally given system, one of the multiple distributed power sources may be configured to operate as a voltage source, while the others as current sources. In this case, only the voltage source will immediately follow the load. Hence, a load that exceeds the capacity of the voltage source cannot be connected to this system. One possible solution to this problem is to allow the current sources to follow the load at the same processing speed as the voltage source, but this requires extremely fast calculation and control of each current source. In addition, in a system where multiple distributed power sources all operate as voltage sources, undesirable potential and phase differences may occur due to communication for synchronization among multiple distributed power sources or due to measurement errors in each distributed power source. These potential and phase differences may not only cause inrush currents when the power is turned on, but also cause unintended, so-called "wrap-around" or reflux of effective and/or reactive power among multiple distributed power supplies.

In view of the above circumstances, one object of the present disclosure is to provide an electric power system capable of performing good control of self-sustaining operation in the case where a plurality of distributed power sources are operated in parallel. More specifically, one subject of the present disclosure is to provide a monitoring device, an inverter device, and a computer program that are suitable for realizing an electric power system capable of providing good control of self-sustaining operation.

SUMMARY

According to a first aspect of the present disclosure, there is provided a monitoring device comprising: a receiving unit configured to receive an effective power output value and a reactive power output value from each of inverter devices; a setting unit configured to set an effective power target value and a reactive power output value for each of the inverter devices; a first calculation unit configured to calculate, upon input of the effective power target value and the effective power output value, a voltage phase command value for each of the inverter devices; a second calculation unit configured to calculate, upon input of the reactive power target value and the reactive power output value, a voltage amplitude command value for each of the inverter devices; a transmitting unit configured to transmit the voltage phase command value and the voltage amplitude command value to a corresponding inverter device; a distribution rate calculating unit configured to calculate a distribution rate for each of the inverter devices; and a total value calculating unit configured to calculate an effective power total value as a sum of the effective power output values of the respective inverter devices and a reactive power total value as a sum of the reactive power output values of the respective inverter devices. The setting unit is configured to calculate the effective power target value for each of the inverter devices, using the effective power total value and a distribution rate for said each of the inverter devices, and calculate the reactive power target value for each of the inverter devices, using the reactive power total value and a distribution rate for said each of the inverter devices.

In preferred embodiment of the monitoring device, the distribution rate calculating unit is configured to calculate a reciprocal of a number of the inverter devices as the distribution rate for each of the inverter devices.

In preferred embodiment of the monitoring device, the distribution rate calculating unit is configured to calculate a ratio of a rated capacity of each inverter device to a total value of rated capacities of the inverter devices as the distribution rate for said each inverter device.

In preferred embodiment of the monitoring device, the inverter devices comprise storage battery controlling devices connected to storage batteries, respectively. The distribution rate calculating unit is configured to calculate a distribution rate for each storage battery controlling device as a ratio of the rated capacity of the storage battery connected to said each storage battery controlling device to a total value of rated capacities of the respective storage batteries. The receiving unit is configured to receive charge rates of the storage batteries via the storage battery controlling devices. The setting unit is configured to correct, based on a difference between an average value of charge rates of the respective storage batteries and a charge rate of the storage battery connected to one of the storage battery controlling devices, the effective power target value for said one of the storage battery controlling devices.

According to a second aspect of the present disclosure, there is provided a power system comprising: a monitoring device in accordance with the first aspect; and a plurality of inverter devices. Each of the plurality of inverter devices comprises: a controlling unit configured to control output voltage; and a measuring unit configured to measure an effective power output value and a reactive power output value, wherein the controlling unit is configured to control the output voltage based on a voltage phase command value and a voltage amplitude command value both transmitted from the monitoring device.

According to a third aspect of the present disclosure, there is provided a computer-readable storage medium comprising a program configured to cause a computer to operate as: a receiving unit configured to receive an effective power output value and a reactive power output value from each of inverter devices; a setting unit configured to set an effective power target value and a reactive power output value for each of the inverter devices; a first calculation unit configured to calculate, upon input of the effective power target value and the effective power output value, a voltage phase command value for each of the inverter devices; a second calculation unit configured to calculate, upon input of the reactive power target value and the reactive power output value, a voltage amplitude command value for each of the inverter devices; a transmitting unit configured to transmit the voltage phase command value and the voltage amplitude command value to a corresponding inverter device; a distribution rate calculating unit configured to calculate a distribution rate for each of the inverter devices; and a total value calculating unit configured to calculate an effective power total value as a sum of the effective power output values of the respective inverter devices and a reactive power total value as a sum of the reactive power output values of the respective inverter devices. The setting unit is configured to calculate the effective power target value for each of the inverter devices, using the effective power total value and a distribution rate for said each of the inverter devices, and calculate the reactive power target value for each of the inverter devices, using the reactive power total value and a distribution rate for said each of the inverter devices.

According to a fourth aspect of the present disclosure, there is provided a power system comprising a plurality of inverter devices configured to supply power to a load.

Each of the plurality of inverter devices comprises:

a measuring unit configured to measure an effective power output and a reactive power output;

a first calculation unit configured to generate an effective power internal value based on the effective power output and calculate an average value of effective power outputs measured in the respective inverter devices;

a second calculation unit configured to generate a reactive power internal value based on the reactive power output and calculate an average value of reactive power outputs measured in the respective inverter devices;

a first setting unit configured to set an effective power target value using the average value of effective power outputs;

a second setting unit configured to set a reactive power target value using the average value of reactive power outputs;

a controlling unit configured to perform output control based on the measured effective power output, the effective power target value, the measured reactive power output and the reactive power target value; and a communication unit configured to transmit internal values including the generated effective power internal value and the generated reactive power internal value to at least one of remaining inverter devices and also configured to receive an internal value from at least one of the remaining inverter devices, wherein the first calculation unit is configured to perform a first calculation process to generate a new effective power internal value, using calculation results based on the generated effective power internal value and the received effective power internal value, the effective power internal value is configured to converge to an average value of effective power outputs by repetition of the first calculation process, the second calculation unit is configured to perform a second calculation process to generate a new reactive power internal value, using calculation results based on the generated reactive power internal value and the received reactive power internal value, the reactive power internal value is configured to converge to an average value of reactive power outputs by repetition of the second calculation process.

In a preferred embodiment of the power system, the power system may further comprise:

a first acquisition unit configured to acquire a rated capacity of an own device; and a third calculation unit configured to generate a rated capacity internal value based on the rated capacity and calculate an average value of rated capacities of the plurality of inverter devices.

The internal values comprise the rated capacity interval value, the first setting unit is configured to set the effective power target value using further the average value of rated capacities, the second setting unit is configured to set the reactive power target value using further the average value of rated capacities, the third calculation unit is configured to perform a third calculation process to generate a new rated capacity internal value, using calculation results based on the generated rated capacity internal value and the received rated capacity internal value, the rated capacity internal value is configured to converge to an average value of rated capacities by repletion of the third calculation process.

In a preferred embodiment of the power system, the power system may further comprise:

a number search unit configured to determine a number of the plurality of inverter devices; and a distribution rate calculating unit configured to calculate a distribution rate for an own device.

The number search unit is conjured to generate a number search internal value and determine the number of the plurality of inverter devices, using the number search internal value, the first setting unit is configured to: calculate an effective power total value by multiplication of the average value of effective power outputs and the number of the plurality of inverter devices; distribute the effective power total value by the distribution rate; and set a distributed value as the effective power target value, the second setting unit is configured to: calculate a reactive power total value by multiplication of the average value of effective power outputs and the number of the plurality of inverter devices; distribute the effective power total value by the distribution rate; and set a distributed value as the reactive power target value.

In a preferred embodiment of the power system, the plurality of inverter devices comprise a plurality of storage battery controlling devices connected to storage batteries, respectively, the plurality of storage battery controlling devices each further comprise:

a second acquisition unit configured to acquire a storage battery capacity and a charge rate of the storage battery connected to an own device;

a fourth calculation unit configured to generate a storage battery capacity internal value based on the storage battery capacity and calculate an average value of storage battery capacities of the plurality of inverter devices; and a fifth calculation unit configured to generate a charge rate internal value based on the charge rate and calculate an average value of charge rates of the storage batteries connected to the plurality of storage battery controlling devices, the internal values further comprise the storage battery capacity internal value and the charge rate internal value, the first setting unit of each storage battery controlling unit is further configured: to calculate the effective power target value, using the rated capacity acquired by the second acquisition unit and the average value of storage battery capacities; correct the calculated effective power target value, using the average value of charge rates and the charge rate acquired by the second acquisition unit; and set the corrected effective power target value as the effective power target value, the fourth calculation unit is configured to perform a fourth calculation process to generate a new storage battery capacity internal value, using calculation results based on the generated storage battery capacity internal value and the received storage battery capacity internal value, the storage battery capacity internal value is configured to converge to an average value of storage battery capacities by repetition of the fourth calculation process, the fifth calculation unit is configured to perform a fifth calculation process to generate a new charge rate internal value, using calculation results based on the generated charge rate internal value and the received charge rate internal value, the charge rate internal value is configured to converge to an average value of charge rates by repetition of the fifth calculation process.

According to a fifth aspect of the present disclosure, there is provided an inverter device for supplying power to a load in cooperation with at least another inverter device. The inverter device may comprise:

a measuring unit configured to measure an effective power output and a reactive power output;

a first calculation unit configured to generate an effective power internal value based on the effective power output and calculate an average value of effective power outputs measured in inverter devices;

a second calculation unit configured to generate a reactive power internal value based on the reactive power output and calculate an average value of reactive power outputs measured in the inverter devices;

a first setting unit configured to set an effective power target value using the average value of effective power outputs;

a second setting unit configured to set a reactive power target value using the average value of reactive power outputs;

a controlling unit configured to perform output control based on the measured effective power output, the effective power target value, the measured reactive power output and the reactive power target value; and a communication unit configured to transmit internal values including the generated effective power internal value and the generated reactive power internal value to at least one of remaining inverter devices and also configured to receive an internal value from at least one of the remaining inverter devices, wherein the first calculation unit is configured to perform a first calculation process to generate a new effective power internal value, using calculation results based on the generated effective power internal value and the received effective power internal value, the effective power internal value is configured to converge to an average value of effective power outputs by repetition of the first calculation process, the second calculation unit is configured to perform a second calculation process to generate a new reactive power internal value, using calculation results based on the generated reactive power internal value and the received reactive power internal value, the reactive power internal value is configured to converge to an average value of reactive power outputs by repetition of the second calculation process.

According to the monitoring device of the present disclosure, when a plurality of inverter devices are operated in parallel, the operation of each inverter device is controlled so that the output power (effective power and reactive power) of each inverter device is appropriately distributed. As a result, the monitoring device can appropriately control the self-sustained operation according to the number of inverter devices, the rated capacity, the type of DC power supply, and the like, and can satisfactorily control the self-sustained operation.

According to the power system of the present disclosure, when a plurality of inverter devices are operated in parallel, the operation of each inverter device is controlled so that the output power (effective power and reactive power) of each inverter device is appropriately distributed. As a result, the electric power system can appropriately control the self-sustaining operation according to the number of inverter devices, the rated capacity, the type of DC power supply, and the like, and can satisfactorily control the self-sustaining operation.

Other features and advantages of the present disclosure will become more apparent by referring to the detailed description given below with reference to the accompanying drawings.

EMBODIMENTS

The embodiments of the present disclosure are described below with reference to the drawings. To begin with, the first through third embodiments of the present disclosure will be described with reference to FIG. 1 through FIG. 7. In FIGS. 1 to 7, the same or similar components are indicated by the same reference signs. Explanations about the same or similar components may be omitted.

Figure 1:
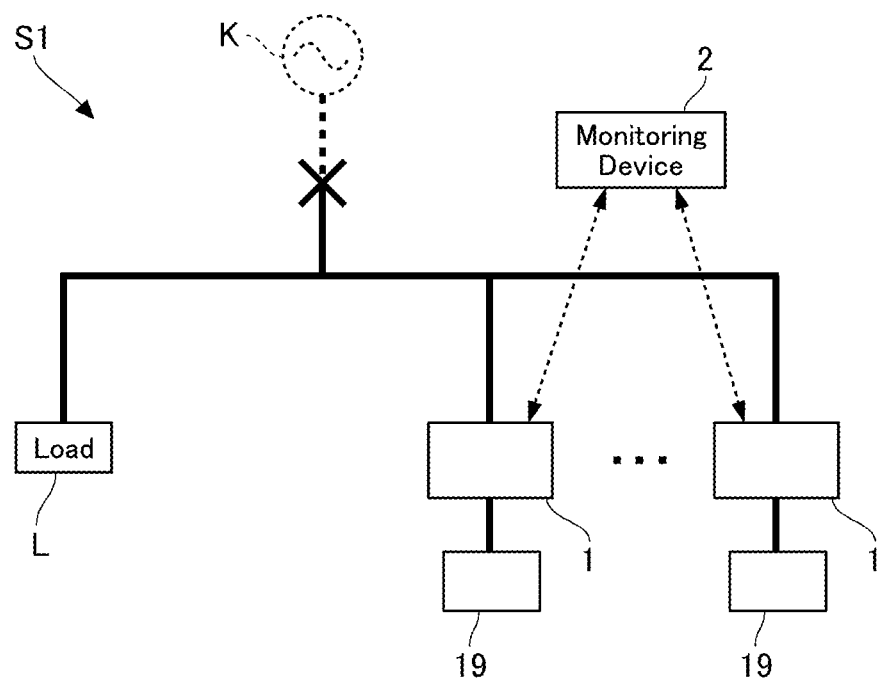
FIG. 1 illustrates an overall configuration of the power system according to a first embodiment.

FIG. 1 shows the overall configuration of the power system S1 of the first embodiment. In the example shown in the figure, the power system S1 is equipped with, for example, a plurality of inverter devices 1 and a monitoring device 2. In this embodiment, the power system S1 is assumed to be equipped with n inverter devices 1 (n is a natural number).

The plurality of inverter devices 1 are connected in parallel with each other. The power system S1 performs self-sustaining operation (non-interconnected operation) when it is disconnected from the power grid K. More specifically, in the power system S1, the plurality of inverter devices 1 and the monitoring device 2 cooperate to control the self-sustaining operation. During self-sustaining operation, power is supplied from the plurality of inverter devices 1 to the load L. Each of the multiple inverter devices 1 and the monitoring device 2 may be configured to communicate with each other. The communication between each inverter device 1 and the monitoring device 2 may be wireless or wired i.e., through connecting lines.

As shown in FIG. 1, a DC power supply 19 is connected to each of the plurality of inverter devices 1. The DC power source 19 is, for example, a generator using renewable energy such as solar cells, a generator using an internal or external combustion engine, or a storage battery. Each inverter device 1 converts the power generated by the DC power source 19 or stored in the DC power source 19 and outputs the converted power. An AC power source may be connected to an inverter device 1 via a rectifier circuit instead of the DC power source 19.

Figure 2:
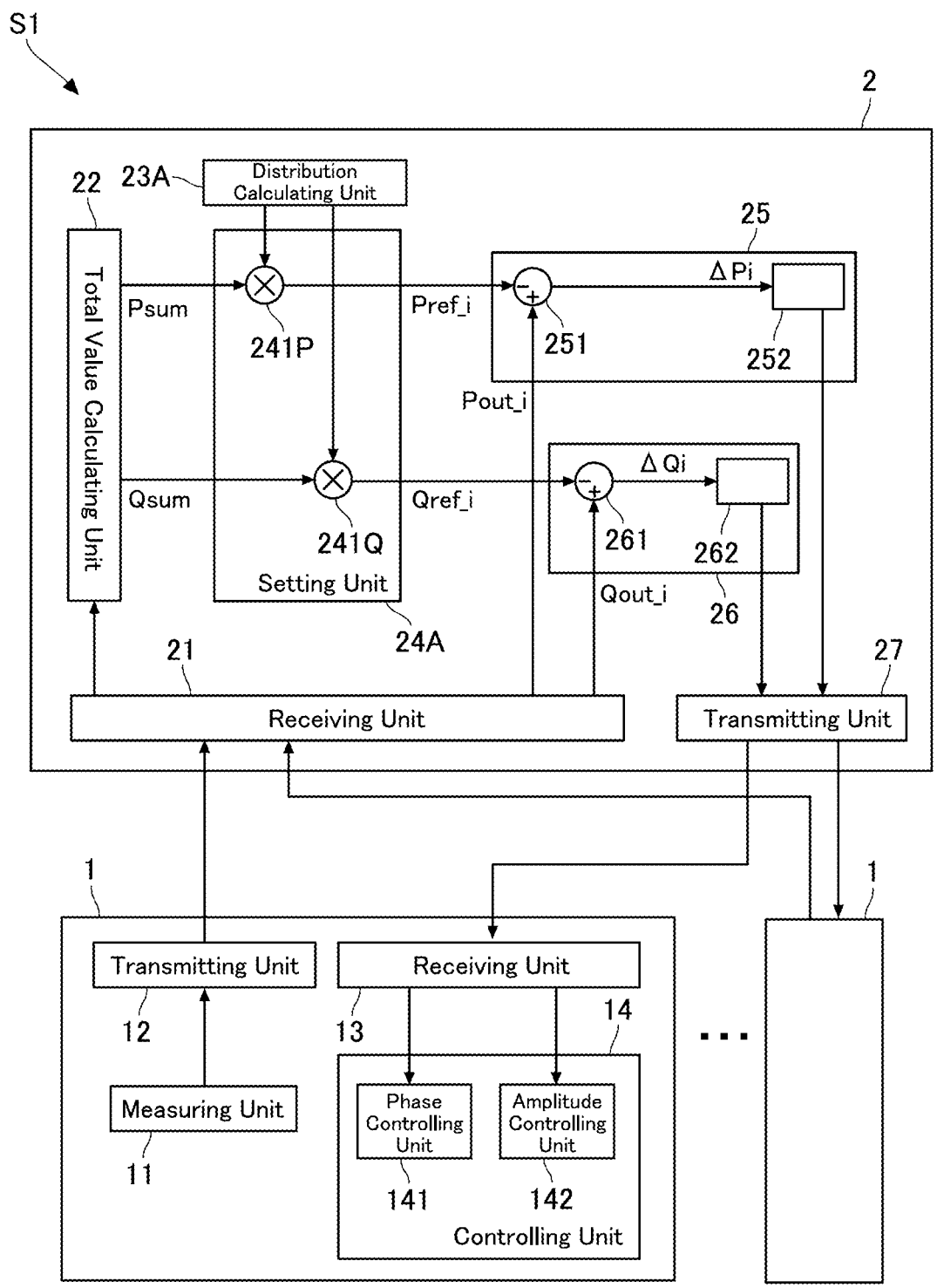
FIG. 2 is a functional block diagram of the power system of the first embodiment.

FIG. 2, illustrating details of the power system S1, is a functional block diagram of the self-sustaining operation control performed by the power system S1.

The plurality of inverter devices 1 each control the output power based on control commands received from the monitoring device 2. Each inverter device 1 is a voltage type inverter that operates as a voltage source, and controls the output power by controlling the output voltage. In this embodiment, the plurality of inverter devices 1 have the same rated capacity (rated output power). As shown in FIG. 2, each inverter device 1 has a measuring unit 11, a transmitting unit 12, a receiving unit 13, and a controlling unit 14.

In each inverter device 1, the measuring unit 11 measures the output value of effective power and the output value of reactive or invalid power from the device concerned (i.e., the inverter device in which the measuring unit 11 is installed; hereinafter referred to as "own device"). In the following, i is a natural number less than or equal to n, and the output value of the effective power of the i-th inverter device 1 is called the effective power output value $Pout\_i$, while the output value of the reactive power of the i-th inverter device 1 is called the reactive power output value $Qout\_i$. The measuring unit 11 is located at the output end (upper end in FIG. 1) of the inverter device 1.

The transmitting unit 12 transmits the information of the own device to the monitoring device 2. The information transmitted by the transmitting unit 12 includes, for example, the effective power output value $Pout\_i$ and the reactive power output value $Qout\_i$ measured by the measuring unit 11. The transmitting unit 12 transmits the information of the own device in predetermined cycles.

The receiving unit 13 receives control commands sent from the monitoring device 2. The receiving unit 13 outputs the received control commands to the controlling unit 14. The control command includes a voltage phase command value and a voltage amplitude command value. The voltage phase command value corresponds to the target value or adjusted value of the phase of the output voltage, and the voltage amplitude command value corresponds to the target value or adjusted value of the amplitude of the output voltage.

The controlling unit 14 controls the output voltage of its own device based on the control commands received by the receiving unit 13. As shown in FIG. 2, the controlling unit 14 includes a phase controlling unit 141 and a amplitude controlling unit 142. The phase controlling unit 141 controls the phase of the output voltage based on a voltage phase command value. If the voltage phase command value is the target value of the phase of the output voltage, the phase controlling unit 141 controls the phase of the output voltage to the voltage phase command value. If the voltage phase command value is the adjusted value of the phase of the output voltage, the phase controlling unit 141 adjusts the phase of the output voltage from the current value by the amount of the voltage phase command value. The amplitude controlling unit 142 controls the amplitude of the output voltage based on the voltage amplitude command value. If the voltage amplitude command value is the target value for the amplitude of the output voltage, the amplitude controlling unit 142 controls the amplitude of the output voltage to the voltage amplitude command value. If the voltage amplitude command value is the adjusted value of the amplitude of the output voltage, the amplitude controlling unit 142 adjusts the amplitude of the output voltage from the current value by the voltage amplitude command value.

The monitoring device 2 acquires information from each inverter device 1 and generates or works out control commands (i.e., voltage phase command values and voltage amplitude command values) for each inverter device 1 based on the acquired information. The monitoring device 2 sends the generated control commands to each inverter device 1. As shown in FIG. 2, the monitoring device 2 includes a receiving unit 21, a total value calculating unit 22, a distribution rate calculating unit 23A, a setting unit 24A, a first calculation unit 25, a second calculation unit 26 and a transmitting unit 27.

The receiving unit 21 receives information sent from each inverter device 1. The information received by the receiving unit 21 may include the effective power output value $Pout\_i$ and the reactive power output value $Qout\_i$ of each inverter device 1. The receiving unit 21 outputs the received effective power output value $Pout\_i$ and reactive power output value $Qout\_i$ to the total value calculating unit 22. The receiving unit 21 outputs the received effective power output value $Pout\_i$ to the first calculation unit 25, and outputs the received reactive power output value $Qout\_i$ to the second calculation unit 26.

The total value calculating unit 22 integrates (adds up) the effective power output values Pout_i of the respective inverter devices 1, thereby calculating an effective power total value Psum. Further, the total value calculating unit 22 integrates the reactive power output values Qout_i of the respective inverter devices 1, thereby calculating a reactive power total value Qsum. Thereafter, the total value calculating unit 22 outputs the obtained effective power total value Psum and the reactive power total value Qsum to the setting unit 24A.

The distribution rate calculating unit 23A calculates distribution rates for the respective inverter devices 1. For example, the distribution rate calculating unit 23A calculates 1/n (the reciprocal of n, where n is the number of the inverter devices) as the distribution rate for each inverter device 1. The numerical information (i.e., the number of the inverter devices 1) may be stored in the monitoring device 2 (distribution rate calculating unit 23A) in advance by user's input. Alternatively, the total number of the inverter devices 1 to be controlled may be counted by the monitoring device 2 when the operation of the power system S1 is initiated. The distribution rate calculating unit 23A outputs the calculated distribution rates to the setting unit 24A.

The setting unit 24A sets a target value of the effective power output value and a target value of the reactive power output value for each inverter device 1. Hereinbelow, The target value of the effective power output value of the i-th inverter device 1 is called the effective power target value Pref_i, and the target value of the reactive power output value of the i-th inverter device 1 is called the reactive power target value Qref_i. The effective power target value Pref_i is obtained by distributing the effective power total value Psum among the plurality of inverter devices 1. Likewise, the reactive power target value Qref_i is obtained by distributing the reactive power total value Qsum among the plurality of inverter devices 1.

As shown in FIG. 2, the setting unit 24A includes two multipliers 241P and 241Q. The effective power target value Pref_i for each inverter device 1 is worked out by the multiplier 241P, and the reactive power target value Qref_i for each inverter device 1 is worked out by the multiplier 241Q.

The multiplier 241P receives the inputs of the effective power total value Psum and the distribution rate for each inverter device, and multiplies the effective power total value Psum by the distribution rate. The setting unit 24A sets this multiplication result by the multiplier 241P as an effective power target value Pref_i. In the present embodiment, the distribution rate corresponds to the reciprocal number (1/n) of the plurality of inverter devices 1. The calculation result by the multiplier 241P is equal to the effective power total value Psum divided by the total number (n) of the inverter devices 1. In other words, effective power target value Pref_i is the average of the effective power output values Pout_i, and the effective power total value Psum is equally distributed among the plurality of inverter devices 1.

The multiplier 241Q receives the inputs of the reactive power total value Qsum and the distribution rate for each inverter device, and multiplies the reactive power total value Qsum by the distribution rate. The setting unit 24A sets this multiplication result by the multiplier 241Q as a reactive power target value Qref_i. In the present embodiment, the distribution rate corresponds to the reciprocal number (1/n) of the plurality of inverter devices 1. The calculation result by the multiplier 241Q is equal to the reactive power total value Qsum divided by the total number (n) of the inverter devices 1. In other words, reactive power target value Qref_i is the average of the reactive power output values Qout_i, and the reactive power total value Qsum is equally distributed among the plurality of inverter devices 1.

The first calculation unit 25 calculates a voltage phase command value for each inverter device 1. Specifically, the first calculation unit 25 receives the inputs of the effective power target value Pref_i and the effective power output value Pout_i of the i-th inverter device 1 as a calculation target. Based on these inputted values, the first calculation unit 25 calculates a voltage phase command value for the target inverter device 1. The first calculation unit 25 performs the same calculation for the respective inverter devices 1. The first calculation unit 25 outputs the obtained voltage phase command values to the transmitting unit 27. As shown in FIG. 2, the first calculation unit 25 includes a differentiator 251 and a controller 252.

The differentiator 251 receives the inputs of the effective power target value Pref_i and the effective power output value Pout_i of the target or i-th inverter device 1. Then, the differentiator 251 calculates the deviation or difference $\Delta Pi$ (=Pout_i−Pref_i) between the effective power output value Pout_i and the effective power target value Pref_i. The differentiator 251 calculates such a deviation $\Delta Pi$ for the respective inverter devices 1. The controller 252 calculates a voltage phase command value to set the deviation $\Delta Pi$ to zero for the i-th inverter device 1. The controller 252 performs proportional control (P-control), for example. The control method of the controller 252 is not limited to proportional control, and may be, for example, PI control or PID control. The controller 252 calculates the voltage phase command value for each of the plurality of inverter devices 1.

The second calculation unit 26 calculates a voltage amplitude command value for each inverter device 1. The reactive power target value Qref_i and the reactive power output value Qout_i of the i-th inverter device 1 to be calculated are input to the second calculation unit 26. The second calculation unit 26 calculates the voltage amplitude command value of the target inverter device 1 based on the inputted reactive power target value Qref_i and reactive power output value Qout_i. The second calculation unit 26 performs this calculation for the respective multiple inverter devices 1. The second calculation unit 26 outputs the calculated voltage amplitude command value to the transmitting unit 27. As shown in FIG. 2, the second calculation unit 26 includes a differentiator 261 and a controller 262.

The differentiator 261 receives the inputs of the reactive power target value Qref_i and the reactive power output value Qout_i of the i-th inverter device 1, and calculates the deviation $\Delta Qi$ (=Qout_i−Qref_i) between the reactive power output value Qout_i and the reactive power target value Qref_i. The differentiator 261 calculates the deviation $\Delta Qi$ for each of the multiple inverter devices 1. The controller 262 calculates the voltage amplitude command value to set the deviation $\Delta Qi$ to zero for the i-th inverter device 1. The controller 262 performs proportional control, for example, by proportional control. The control method of the controller 262 is not limited to proportional control, but can be PI control or PID control, for example. The controller 262 calculates a voltage amplitude command value for each of the plurality of inverter devices 1.

The transmitting unit 27 transmits control commands, including voltage phase command values and voltage amplitude command values, to each inverter device 1. The voltage phase command value is inputted from the first calculation unit 25, and the voltage amplitude command value is inputted from the second calculation unit 26.

Figure 3:
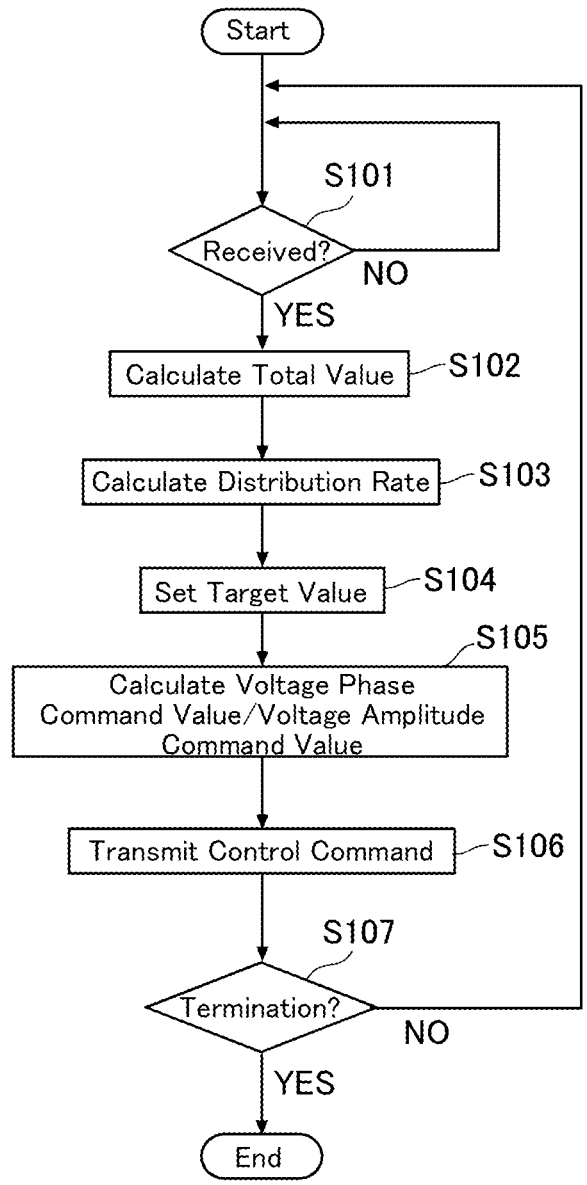
FIG. 3 is a flowchart showing the process of a monitoring device for the first embodiment.

FIG. 3 shows a flowchart of the process performed by the monitoring device 2 in the self-sustaining operation control of the power system S1. The process may start when the monitoring device 2 is activated.

Each inverter device 1 sends out the effective power output value Pout_i and the reactive power output value Qout_i. After that, the receiving unit 21 receives the effective power output value Pout_i and reactive power output value Qout_i (S101: YES). If the receiving unit 21 does not receive an effective power output value Pout_i and a reactive power output value Qout_i in step S101 (S101: NO), the receiving unit 21 waits until it receives the effective power output value Pout_i and the reactive power output value Qout_i.

Next, the total value calculating unit 22 calculates or works out the effective power total value Psum and reactive power total value Qsum (S102). Then, the distribution rate calculating unit 23A calculates the distribution rate for each inverter device 1 (S103). In the example shown in FIG. 3, the calculation of the distribution rate (step S103) is performed a required number of times, since the calculation is performed each time the receiving unit 21 receives the effective power output value Pout_i and reactive power output value Qout_i. Alternatively, the distribution calculation may be performed only once. In an embodiment, the calculation of distribution rate may be performed only once at the time when the self-sustaining operation of the power system S1 is started (or at the initial step thereof after a predetermined control is started).

Next, the setting unit 24A sets the effective power target value Pref_i and reactive power target value Qref_i for each inverter device 1 (S104). Then, the first calculation unit 25 calculates a voltage phase command value for each inverter device 1, and the second calculation unit 26 calculates a voltage amplitude command value for each inverter device 1 (S105). Next, the transmitting unit 27 sends control commands, including voltage phase command value and voltage amplitude command value, to each inverter device 1 (S106).

After that, the monitoring device 2 makes a termination judgment (S107). If the monitoring device 2 determines that termination is not effected (S107: NO), the process returns to step S101, the process from step S101 to step S106 are repeated until the termination is effected. On the other hand, when judging that the termination is effected (S107: YES), the monitoring device 2 ends the process. At step S107, when the power of the monitoring device 2 is turned off or the process is stopped by the user, the termination is effected.

Each part of the monitoring device 2 may be realized as a digital circuit, for example, but it may also be realized as an analog circuit. In addition, the processing performed by each part of the monitoring device 2 (FIG. 3) may be designed as a computer-readable program, and the computer may operate to function as the monitoring device 2 by the execution of the program. The program may be recorded on a storage medium and read out by the computer.

The advantages of the power system S1 are as follows.

In the power system S1, the monitoring device 2 is equipped with the distribution rate calculating unit 23A configured to work out the reciprocal (1/n) of the number of the inverter devices 1 as the distribution rate for each inverter device 1. Then, the setting unit 24A distributes the effective power total value Psum to the inverter devices 1 depending on the distribution rates for the respective inverter devices 1, thereby setting the effective power target values. Further, the setting unit 24A distributes the reactive power total value Qsum to the inverter devices 1 depending on the distribution rates for the respective inverter devices 1, thereby setting the reactive power target values. Thereafter, the first calculation unit 25 calculates voltage phase command values that cause the effective power output values of the respective inverter devices 1 to be equal to their effective power target values, and the second calculation unit 26 calculates voltage amplitude command values that cause the reactive power output values of the respective inverter devices 1 to be equal to their reactive power target values. Each inverter device 1 controls its output voltage in accordance with the relevant voltage phase command value and voltage amplitude command value calculated by the monitoring dev vice 2. In this manner, it is possible to equalize the output powers (effective power and reactive power) of the respective inverter devices 1, and the monitoring device 2 controls the plurality of inverter devices 1 so that they operate in the same (or substantially same) manner. Accordingly, by the power system S1, even if each inverter device 1 is configured as a voltage type inverter, the phase difference and potential difference (amplitude difference) between these inverter devices 1 can be suppressed. As noted above, the effective power wrap-around is caused by the phase shifts (differences) of the output voltages of the inverter devices 1, and the reactive power wrap-around is caused by the amplitude shifts (differences) of the output voltages of the inverter devices 1. By the power system S1, since the voltage/phase differences among the plurality of inverter devices 1 can be suppressed, it is possible to prevent undesired power wrap-around from occurring for the inverter devices 1. Accordingly, the power system S1 is advantageous to enabling the plurality of inverter devices 1 connected in parallel to perform proper self-sustaining operation depending on the number of the inverter devices 1. From another angle, the monitoring device 2 can control the plurality of inverter devices 1 connected in parallel so that they perform proper self-sustaining operation depending on the number of the inverter devices 1.

Figure 4:
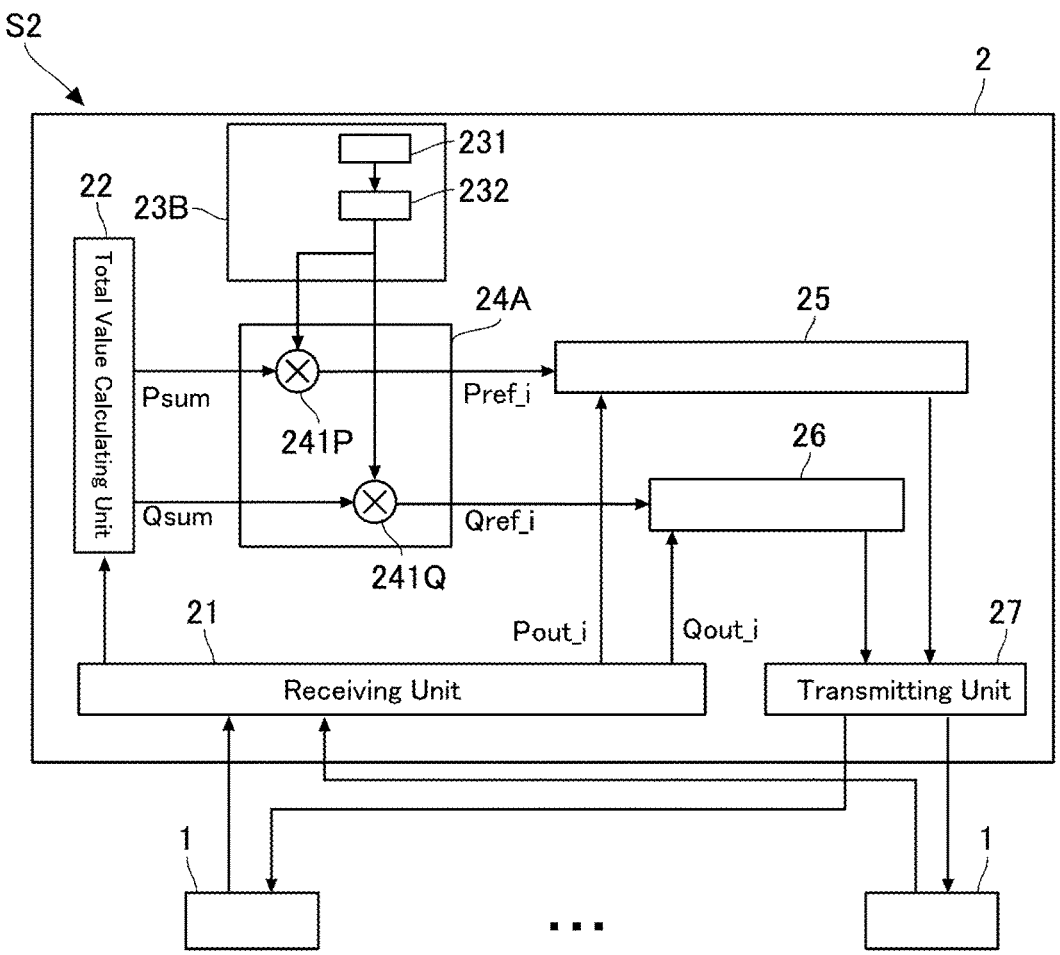
FIG. 4 is a functional block diagram of the power system for a second embodiment.

The second embodiment of the power system S2 will now be described. FIG. 4 is a functional block diagram explaining the self-sustaining operation control performed by the power system S2. The overall configuration of the power system S2 is the same as the overall configuration of the power system S1 (FIG. 1). In the self-sustaining operation control of power system S2, the process performed by monitoring device 2 is the same as the process performed by monitoring device 2 in power system S1 (FIG. 3). The power system S2 differs from the power system S1 in that the plurality of inverter devices 1 include at least two inverter devices 1 with different rated capacities. In other words, the inverter devices 1 have different rated capacities.

As shown in FIG. 4, the power system S2 differs from the power system S1 in that the monitoring device 2 has a distribution rate calculating unit 23B instead of a distribution rate calculating unit 23A.

The distribution rate calculating unit 23B includes two arithmetic units or calculation units 231, 232 for calculating a distribution rate. The calculation unit 231 integrates the rated capacities of the respective inverter devices 1 to work out a total rated capacity or a rated capacity total value. The calculation unit 232 divides the rated capacity of an inverter device 1 as a calculation target by the rated capacity total value. As a result, the distribution rate of this inverter device 1 is calculated. In the second embodiment, the distribution rate is the ratio of the rated capacity of each inverter device 1 to the total rated capacity of the respective inverter devices 1 ("rated capacity total value"). The calculation of the distribution rate by the calculator 232 is performed for each inverter device 1. The rated capacity of each inverter device 1 may be stored in advance in the monitoring device 2 (distribution rate calculator 23B) by the user. Alternatively, the monitoring device 2 may obtain the rated capacity of a relevant inverter device from this inverter device 1 at the start of operation of the power system S2 (or after the start of operation). Alternatively, the monitoring device 2 may receive it from each inverter device 1 at the same time when the effective power output value and the reactive power output value are obtained. The distribution rate calculation unit 23B outputs the distribution rate of each inverter device 1 to the setting unit 24A.

In the power system S2, the setting unit 24A distributes the effective power total value Psum depending on the distribution rate from the distribution rate calculating unit 23B, and sets the resulting value as the effective power target value Pref_i for the relevant inverter device 1. In this configuration, the larger the rated capacity of the inverter device 1, the larger the effective power target value Pref_i. Likewise, in the power system S2, the setting unit 24A distributes the reactive power total value Qsum depending on the distribution rate from the distribution rate calculating unit 23B, and sets the resulting value as the reactive power target value Qref_i for the relevant inverter device 1. In this configuration, the larger the rated capacity of the inverter device 1, the larger the reactive power target value Qref_i.

In the power system S2 described above, the monitoring device 2 uses the distribution rate calculating unit 23B for working out a distribution rate, or the ratio of the rated capacity of each inverter device 1 to the total rated capacities of the respective inverter devices 1. Then, by the workings of the setting unit 24A, the effective power total value Psum is distributed depending on the distribution rates for the respective inverter devices 1 and is set as a effective power target value. Similarly, the reactive power total value Qsum is distributed according to the distribution rate of each inverter device 1 and set as the reactive power target value by the workings of the setting unit 24A. In this configuration, the monitoring device 2 can perform proper distribution of outputs for the respective inverter devices 1 of different rated capacities in light of their different rated capacities. Thus, in the power system S2, when the multiple inverter devices 1 are operated in parallel, appropriate self-sustaining operation can be performed in accordance with the number of the inverter devices 1 and the rated capacity of each inverter device 1. Also, the monitoring device 2 is suitably used for the power system in which appropriate self-sustaining operations of the respective inverter devices 1 can be performed in accordance with the number of these devices and the rated capacity thereof.

The second embodiment above illustrates an example where at least two inverter devices 1 may have different rated capacities. Alternatively, it is also possible that the rated capacities of all the plural inverter devices 1 are the same. In this case, the distribution rate calculated by the distribution rate calculating unit 23B will be the same as the distribution rate calculated by the distribution rate calculating unit 23A. Thus, the output powers (effective power and reactive power) of the plurality of inverter devices 1 are equalized, whereby the same advantages as in the power system S1 can be achieved.

Figure 5:
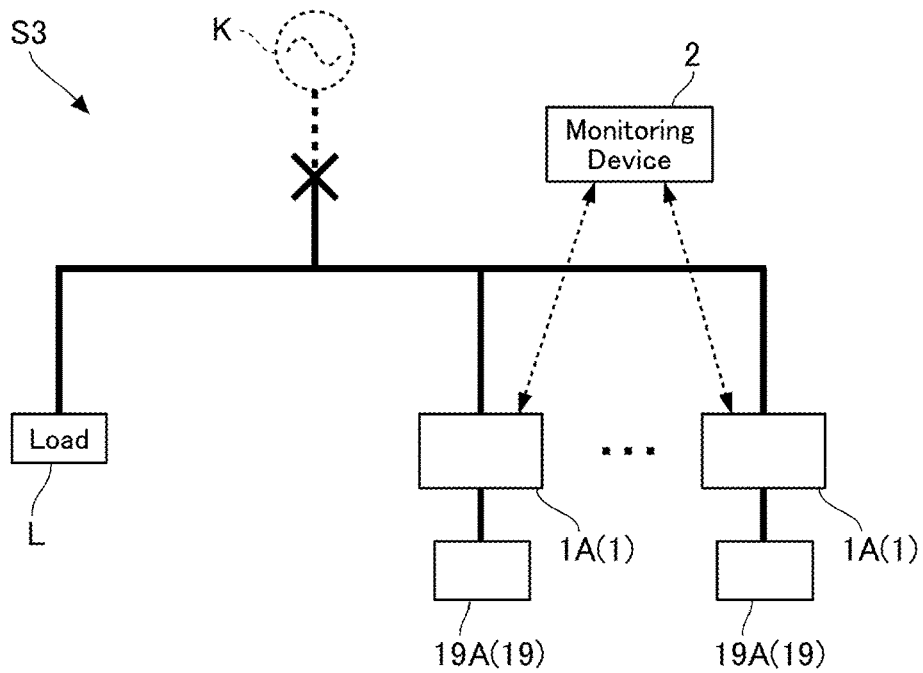
FIG. 5 is a functional block diagram of the power system for a third embodiment.
Figure 6:
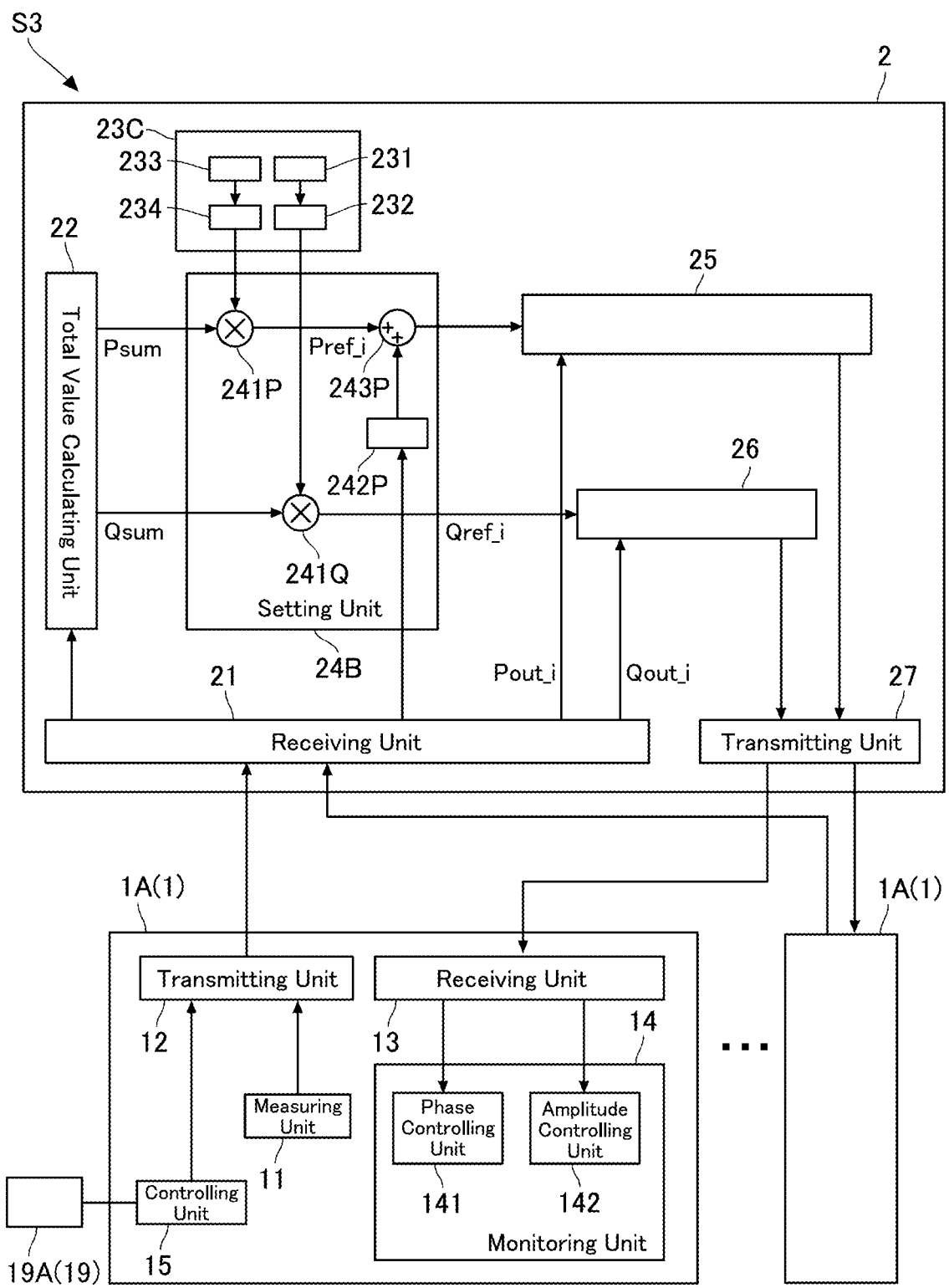
FIG. 6 is a functional block diagram of the power system for the third embodiment.

A power system S3 according to a third embodiment will be described below with reference to FIGS. 5 and 6. FIG. 5 shows an example of the overall configuration of the power system S3. FIG. 6 is a functional block diagram illustrating the self-sustaining operation control performed by the power system S3. The process performed by the monitoring device 2 for the self-sustaining operation control of the power system S3 is the same as the process performed by the monitoring device 2 in the power system S1 (see FIG. 3).

The power system S3 includes one or more storage battery controlling devices 1A. As will be described in detail below, the storage battery controlling device 1A is an inverter unit 1 equipped with a new functional part (monitoring unit 15) incorporated, and in this sense, the storage battery controlling device 1A can be considered as a type of inverter device. Thus, in the present disclosure, when one (or more) of the multiple inverter devices 1 installed in the power system S3 is a storage battery controlling device 1A, this situation may be described as "multiple inverter devices include one (or more) storage battery controlling device." The power system S3 shown in FIG. 5 (and FIG. 6) includes a plurality of storage battery controlling devices 1A, but does not include an inverter device 1 described above. Thus, the multiple inverter devices in the power system S3 are all storage battery controlling devices. As shown in FIG. 5, each storage battery controlling device 1A is connected to a storage battery 19A as a DC power source or power supply. In the illustrated example, the rated capacities of the respective storage battery controlling devices 1A are the same, i.e., equal to each other, while the rated capacities ("storage battery capacities") of the respective storage batteries 19A are not the same.

Each storage battery controlling device 1A has substantially the same configuration as the inverter device 1, but differs in that it is further equipped with a monitoring unit 15, as shown in FIG. 6. The monitoring unit 15 is configured to monitor the corresponding storage battery 19A (i.e., the storage battery connected to this monitoring unit 15) to check the state of charge ("SoC") of the battery 19A. Each storage battery controlling device 1A sends information on the charge rate of storage battery 19A, together with the effective power output value Pout_i and reactive power output value Qout_i, to the monitoring device 2 via the transmitting unit 12.

As shown in FIG. 6, the power system S3 differs from the power systems S1, S2 in the configuration of the monitoring device 2. Specifically, the monitoring device 2 of the power system S3 is equipped with a distribution rate calculating unit 23C instead of the distribution rate calculating units 23A and 23B, and with a setting unit 23B instead of the setting unit 24A.

The distribution rate calculating unit 23C calculates first and second distribution rates for each storage battery controlling device 1A. Hereinbelow, one of the storage battery controlling device 1A among the plurality of storage battery controlling devices 1A ("target storage battery controlling device 1A") is described, though the same explanation holds for the other storage battery controlling devices 1A. As shown in FIG. 6, the distribution rate calculation unit 23C includes calculation units 231, 232, 233 and 234. The calculation units 233, 234 calculate the first distribution rate, and the calculation units 231, 232 calculate the second distribution rate.

The calculation unit 233 integrates the rated capacities of the respective storage batteries 19A and calculates a storage battery capacity total value. The calculation unit 234 divides the storage battery capacity of the storage battery 19A ("target storage battery 19A") connected to the target storage battery controlling device 1A by the storage battery capacity total value, thereby working out a first distribution rate for the target storage battery controlling device 1A. Hence, the first distribution rate is the ratio of the storage battery capacity of one storage battery 19A to the total value of the storage battery capacities of the plurality of storage batteries 19A ("storage battery capacity total value"). The calculation of the first distribution rate by the calculation unit 234 is performed for each storage battery controlling device 1A. The storage battery capacity of each storage battery 19A may be stored in advance in the monitoring device 2 (distribution rate calculating unit 23C) by user input. Alternatively, it may be obtained by the monitoring device 2 from each storage battery controlling device 1A when the operation of the power system S3 is started. Alternatively, it may be obtained by the monitoring device 2 from each storage battery controlling device 1A together with other information such as the effective power output value and the reactive power output value. The distribution rate calculating unit 23C outputs the calculated first distribution rate of each storage battery controlling device 1A to the setting unit 24B (multiplier 241P).

The calculators 231, 232 calculate the second distribution rate for the target storage battery controlling device 1A by the same calculation as in the second embodiment. Thus, the second distribution rate is the ratio of the rated capacity of one storage battery controlling device 1A to the total value of the rated capacities of the plurality of storage battery controlling devices 1A (rated capacity total value). In an embodiment, the second distribution rate may be the same as the distribution rate in the first embodiment. In this case, the distribution rate calculating unit 23C calculates the reciprocal (1/n) of the number of storage battery controlling devices 1A as the second distribution rate. The distribution rate calculating unit 23C outputs the calculated second distribution rate of the target storage battery controlling device 1A to the setting unit 24B (multiplier 241Q).

The setting unit 24B sets the value obtained by distributing the effective power total value according to the first distribution rate of the target storage battery controlling device 1A as an effective power target value of the target storage battery controlling device 1A. After that, this effective power target value is corrected by the difference between the average value of the charge rates of the plurality of storage batteries 19A and the charge rate of the target storage battery 19A, and this corrected effective power target value is output to the first calculation unit 25. In this manner, the first calculation unit 25 of the present embodiment works out a voltage phase command value using the corrected effective power target value. The setting unit 24B sets the value obtained by distributing the total reactive power value according to the second distribution rate of the target storage battery controlling device 1A as a reactive power target value of the target storage battery controlling device 1A. As described above, in the present embodiment, the result of the output distribution based on the storage battery capacity (distribution by the first distribution rate) is corrected by the charge rate, whereas the result of the output distribution based on the rated capacity of the storage battery controlling device (distribution by the second distribution rate) is not subject to such correction. This is because the correction based on the charge rate only needs to be performed for the effective power that will affect the charge/discharge of the storage battery 19A.

As shown in FIG. 6, the setting unit 24B includes a calculator 242P and an adder 243P in addition to the two multipliers 241P and 241Q. The effective power target value of the target storage battery controlling device 1A is calculated by the multiplier 241P and then corrected by the calculation unit 242P and the adder 243P. Further, the reactive power target value of the target storage battery controlling device 1A is calculated by the multiplier 241Q.

The multiplier 241P in the present embodiment multiplies the effective power total value Psum inputted from the total value calculating unit 22 by the first distribution rate (of the target storage battery controlling device 1A) inputted from the distribution rate calculating unit 23C. The multiplier 241P outputs this multiplication result (provisional effective power target value Pref_i) to the calculation unit 243P. The multiplier 241Q in the present embodiment multiplies the reactive power total value Qsum inputted from the total value calculating unit 22 by the second distribution rate (of the target storage battery controlling device 1A) inputted from the distribution rate calculating unit 23C. The multiplier 241Q outputs this multiplication result (reactive power target value Qref_i) to the second calculation unit 26.

The calculator 242P works out the average value of the charge rates of the plurality of storage batteries 19A, and then calculates the difference $\Delta SoCi$ between the average value of the charge rates and the charge rate of the target storage battery 19A. The charge rate of each storage battery 19A is received from each storage battery controlling device 1A by the receiving unit 21, and then inputted to the calculation unit 242P from the receiving unit 21. The calculation unit 242P includes a controller (not shown), and this controller calculates a correction value for causing the difference $\Delta SoCi$ to become zero for the target storage battery controlling device 1A. The controller may perform, for example, proportional control. Alternatively, the controller may be configured to perform PI control or PID control.

The multiplication result (effective power target value) by the multiplier 241P and the correction value calculated by the calculation unit 242P are input to the adder 243P. The adder 243P adds the correction value to the multiplication result (effective power target value), thereby correcting the effective power target value.

Figure 7:
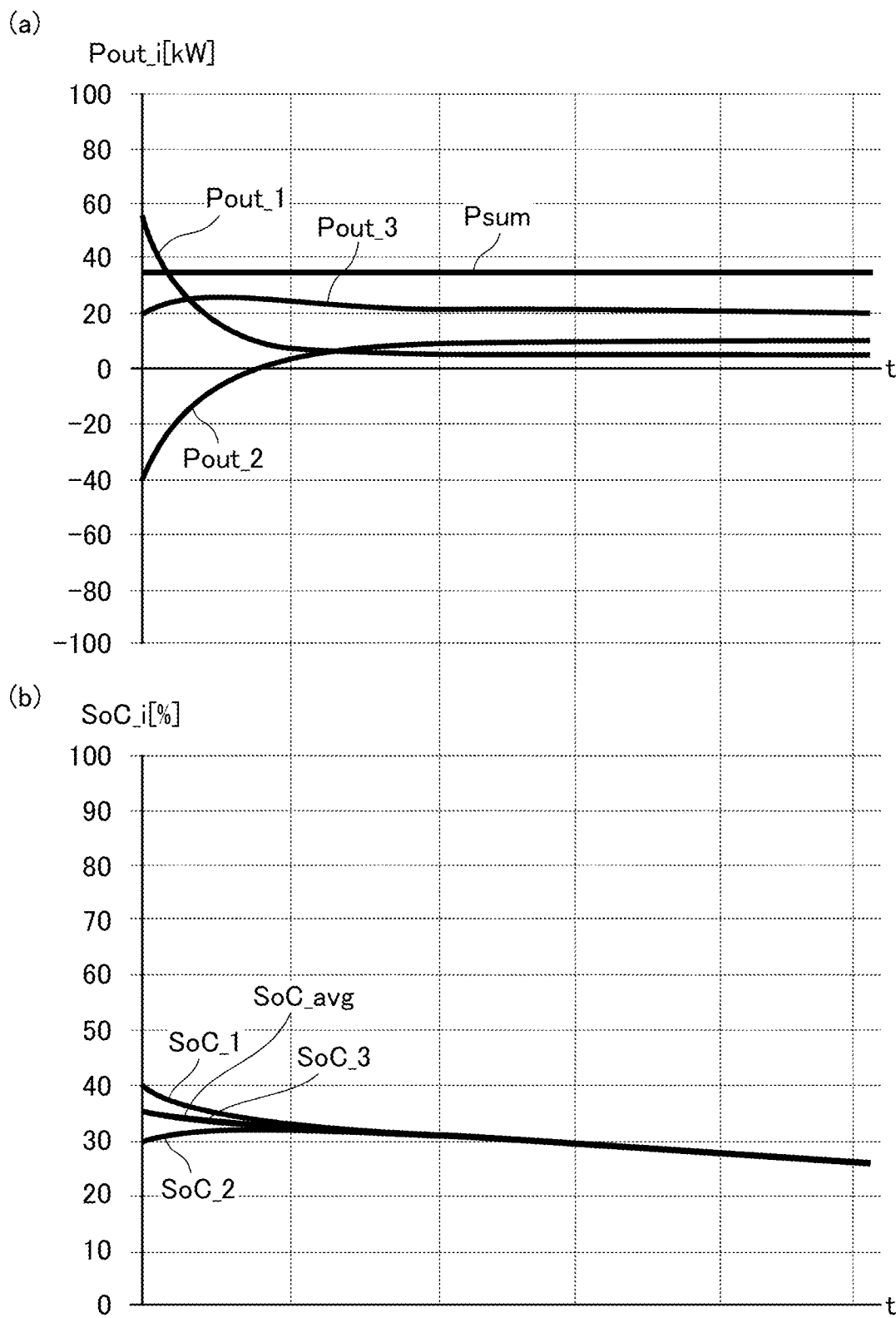
FIG. 7 shows the simulation results of the power system for the third embodiment.

FIG. 7 shows the results of simulating the self-sustaining operation control using a power system S3 equipped with three storage battery controlling devices 1A as a model. FIG. 7(a) shows the change of the effective power output value of each storage battery controlling device 1A over time. In FIG. 7(a), the vertical axis represents the effective power output value of each storage battery controlling device 1A, and the horizontal axis represents time. FIG. 7(b) shows the change of the charge rate of the storage battery 19A connected to each storage battery controlling device 1A over time. In FIG. 7(b), the vertical axis represents the charge rate of each storage battery 19A, and the horizontal axis represents time.

In FIG. 7, the effective power output value of a first storage battery controlling device 1A is indicated by Pout_1, and the charge rate of the storage battery 19A connected to this storage battery controlling device 1A is indicated by SoC_1. Similarly, the effective power output value of a second storage battery controlling device 1A is indicated by Pout_2, and the charge rate of the storage battery 19A connected to this storage battery controlling device 1A is indicated by SoC_2. Further, the effective power output value of a third storage battery controlling device 1A is indicated by Pout_3, and the charge rate of the storage battery 19A connected to this storage battery controlling device 1A is indicated by SoC_3. The total of the effective power output values of these three storage battery controlling devices 1A is shown by Psum, and the average value of the charge rates of the three storage batteries 19A is shown by SoC_avg. In the example shown in FIG. 7(b), the charge rate SoC_3 and the average charge rate SoC_avg are not substantially different from each other and therefore overlap with each other.

The three storage battery controlling devices 1A have the same rated capacity, though the storage battery capacity of the connected storage battery 19A and the charge rate thereof at the start of the simulation (hereinafter referred to as "start charge rate") are different. Specifically, the storage battery 19A connected to the first storage battery controlling device 1A has a storage battery capacity of 50 kWh, and its charge rate at the start of the simulation is 40%. The storage battery 19A connected to the second storage battery controlling device 1A has a storage battery capacity of 100 kWh, and its charge rate at the start of the simulation is 30%. The storage battery 19A connected to the third storage battery controlling device 1A has a storage battery capacity of 200 kWh, and its charge rate at the start of the simulation is 35%. In this case, the first distribution rates calculated by the distribution calculation unit 23C are as follows. The first distribution rate for the first storage battery controlling device 1A is 1/7 (=50/(50+100+200)), and the first distribution rate for the second storage battery controlling device 1A is 2/7(=50/(50+100+200)), and the first distribution rate to the third storage battery controlling device 1A is 4/7 (=200/(50+100+200)).

At the start of the simulation, the effective power output value Pout_1 of the first storage battery controlling device 1A is about 55 kW, the effective power output value Pout_1 of the second storage battery controlling device 1A is about −40 kW, and the effective power output value Pout_3 of the third storage battery controlling device 1A is about 20 kW. Note that the effective power output value Pout_1 of the second storage battery controlling device 1A is a negative value because the relevant storage battery 19A is being charged. Thus, at the start of the simulation, the effective power total value Psum of the three storage battery controlling devices 1A is 35 kW (=55−40+20). In this case, the multiplier 241P (setting unit 24B) outputs, as a result of multiplication, 5 kW as the effective power target value (provisional) for the first storage battery controlling device 1A, which value results from the product of the first distribution rate and the effective power total value Psum ((1/7)× (35)). The effective power target values (provisional) of the second and third storage battery controlling devices 1A are calculated in the same manner, which are 10 kW and 20 kW, respectively. It should be noted that these values are effective power target values obtained before the correction of the difference in charge rate by the calculation unit 242P and the adder 243P is performed (in other words, provisional effective power target values).

As shown in FIG. 7(a), even if the output of each storage battery controlling device 1A is changed according to the storage battery capacity of each storage battery 19A, the effective power total values Psum of the three storage battery controlling devices 1A does not change, i.e., remains constant. As shown in FIG. 7(b), though the charge rates of the respective storage batteries 19A at the start of the simulation are different, they converge to the same value over time. When the charge rates SoC_1, SoC_2 and SoC_3 of the respective storage batteries 19A converge to the same value, the correction by the calculation unit 242P and the adder 243P is not performed. Hence, the effective power output values Pout_1, Pout_2, and Pout_3 of the respective storage battery controlling device 1A are the above-noted effective power target values of 5 kW, 10 kW and 20 kW.

The monitoring device 2 of the power system S3 uses the distribution rate calculating unit 23C to calculate the ratio of the rated capacity of each storage battery 19A to the total value of the rated capacities of the plurality of storage batteries 19A, and this calculated value is set as a first distribution rate for the storage battery controlling device 1A to which the storage battery 19A is connected. The setting unit 24B distributes the total effective power output value (effective power total value Psum) of the plurality of storage battery controlling devices 1A according to the first distribution rates of the respective storage battery controlling devices 1A, and these values are set as effective power target values for the respective storage battery controlling devices 1A. With such configurations, the monitoring device 2 can perform suitable output distribution according to the storage battery capacities of the respective storage batteries 19A even when the storage battery capacities (rated capacities of the storage batteries 19A) are different. Thus, in operating multiple storage battery controlling devices 1A (inverter devices 1 to which storage batteries are connected) in parallel, the power system S3 can perform proper self-sustaining operation according to the number of the storage battery controlling devices 1A and the rated capacity (storage battery capacity) of each storage battery 19A. In other words, in operating multiple storage battery controlling devices 1A in parallel, the use of the monitoring device 2 makes it possible to enable proper self-sustaining operation according to the number of the storage battery controlling devices 1A and the rated capacity (storage battery capacity) of each storage battery 19A, whereby improved self-sustaining operation of the power system S3 can be expected.

In the power system S3, the setting unit 24B of the monitoring device 2 corrects the effective power target value Pref_i by the difference between the average value of the charge rates of the storage batteries 19A and the charge rate of each storage battery 19A. According to this configuration, when there is a difference in the charge rates of the respective storage batteries 19A, the charge rate of each storage battery 19A can be averaged (the bias of the charge rates can be suppressed). In other words, in the power system S3, it is possible to perform control for intentionally wrapping power between a plurality of inverter devices 1 (storage battery controlling devices 1A) and average the charge rates of the plurality of storage batteries 19A.

The monitoring devices, power systems and programs of the present disclosure are not limited to the above-described embodiments. The specific configuration of each part of the monitoring device, the power system and the program of the present disclosure can be modified in many ways.

Hereinbelow, the electric power systems (and the inverter devices) according to the fourth to sixth embodiments of the present disclosure will be described with reference to FIGS. 8 to 13. It should be noted that the reference numerals used below for explaining the fourth to sixth embodiments ("second group") are independent of the references numerals used for explaining the first to third embodiments (the first group). Hence, the same reference numerals may be used to refer to different components of the first and the second groups, or different reference numerals may refer to the same (or similar) components of these two groups. In the fourth to sixth embodiments described below, the same or similar components may be designated by the same reference numerals, and duplicate description may be omitted.

Figure 8:
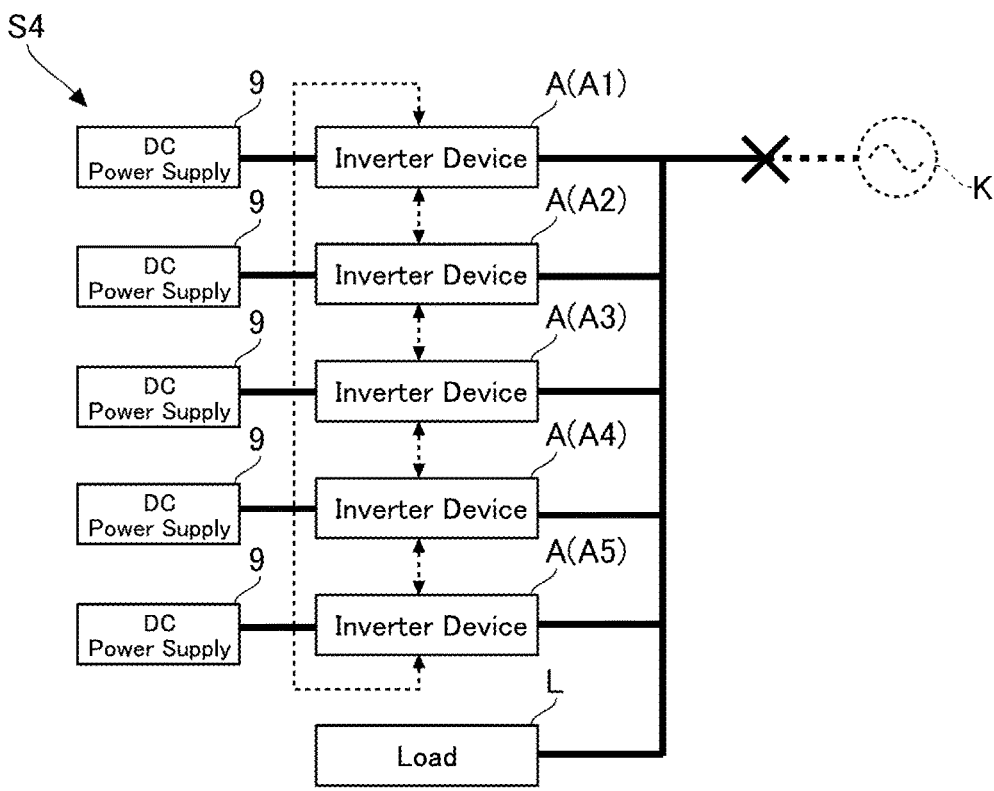
FIG. 8 illustrates an overall configuration of the power system according to a fourth embodiment.

FIG. 8 shows an overall configuration of the power system S4 of the fourth embodiment. As shown in the figure, the power system S4 includes n (n is a natural number) of inverter devices A. In the example shown in FIG. 8, the power system S4 includes five inverter devices A. When the five inverter devices A need to be distinguished from each other, they are referred to as inverter devices A1, ..., A5. In FIG. 8, the thick lines indicate the power connection lines, and the dotted lines with an arrow indicate that the relevant inverter devices A communicate with each other. As shown in FIG. 8, in the power system S4, a plurality of inverter devices A (A1 to A5) are electrically connected in parallel to each other. The electric power system S4 is configured to perform self-sustaining operation (non-interconnected operation) in a state of being disconnected from the power transmission network K. In the electric power system S4, self-sustaining operation control is performed so that each of the inverter devices A can operate in a coordinated and distributed manner. During the self-sustaining operation, electric power will be supplied to the load L from the inverter devices A.

As shown in FIG. 8, a DC power supply 9 is connected to each of the inverter devices A. The DC power source 9 is, for example, a generator using renewable energy such as a solar cell, a generator using an internal combustion engine or an external combustion engine, a storage battery, or the like. Each inverter device A is configured to appropriately convert and then output electric power generated by the DC power source 9 (or electric power stored in the DC power source 9). In a different example, an AC power supply may be connected, via a rectifier circuit, to each inverter device A instead of the DC power supply 9.

Figure 9:
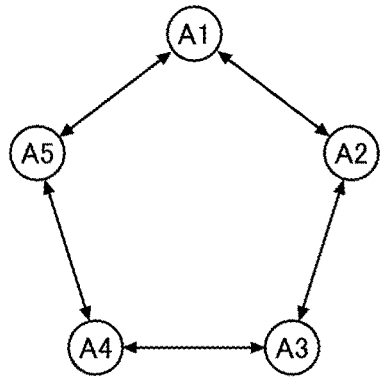
FIG. 9 provides graphical representation of the power system for the fourth embodiment.
Figure 9:
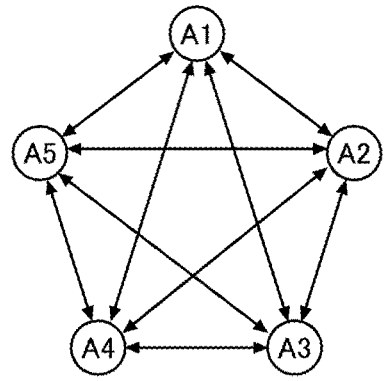
Figure 9:
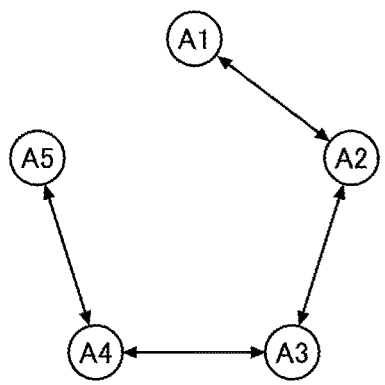
Figure 9:
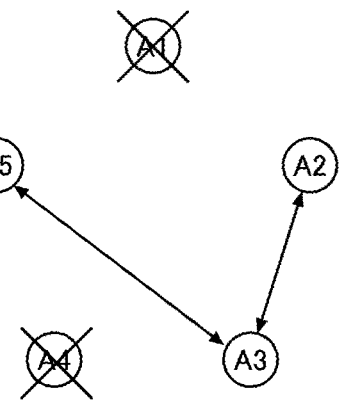

Each of the plurality of inverter devices A can communicate with at least one of the other inverter devices A. FIG. 9 illustrates some graphs for showing communication connection states of the plurality of inverter devices A. In each graph of FIG. 9, the five vertices represent the five inverter devices A1 to A5, and the sides with arrows represent the communication states between the inverter devices A. Each side indicates that mutual communication is performed. In the power system S4, a plurality of inverter devices A communicate with each other in a connection relationship shown in FIG. 9(a), for example. As shown in FIG. 9(a), a communication path exists for any two vertices (inverter devices A) of the graph, and thus the graph is referred to as "connected". The communication of the inverter devices A in the power system S4 is not limited to the relationship shown in FIG. 9(a), and other connection relationships shown in FIGS. 9(b) and 9(c) may be adoptable. These graphs of FIGS. 9(b) and 9(c) are also connected. In this manner, it suffices that each inverter device A can communicate with at least one of the plurality of inverter devices A, and there exists a communication path provided for any two inverter devices A in the power system S4 (connected state). In other words, it is not necessary for all the inverter devices A to communicate directly with each other. Further, as shown in FIG. 9(d), two inverter devices A1 and A4 may be inactive, while the three inverter devices A2, A3 and A5 may be communicating with each other. In this case, the self-sustaining operation is controlled by the three inverter devices A2, A3, and A5. In this case, the self-sustaining control is performed with these three inverter devices A2, A3 and A5.

Figure 10:
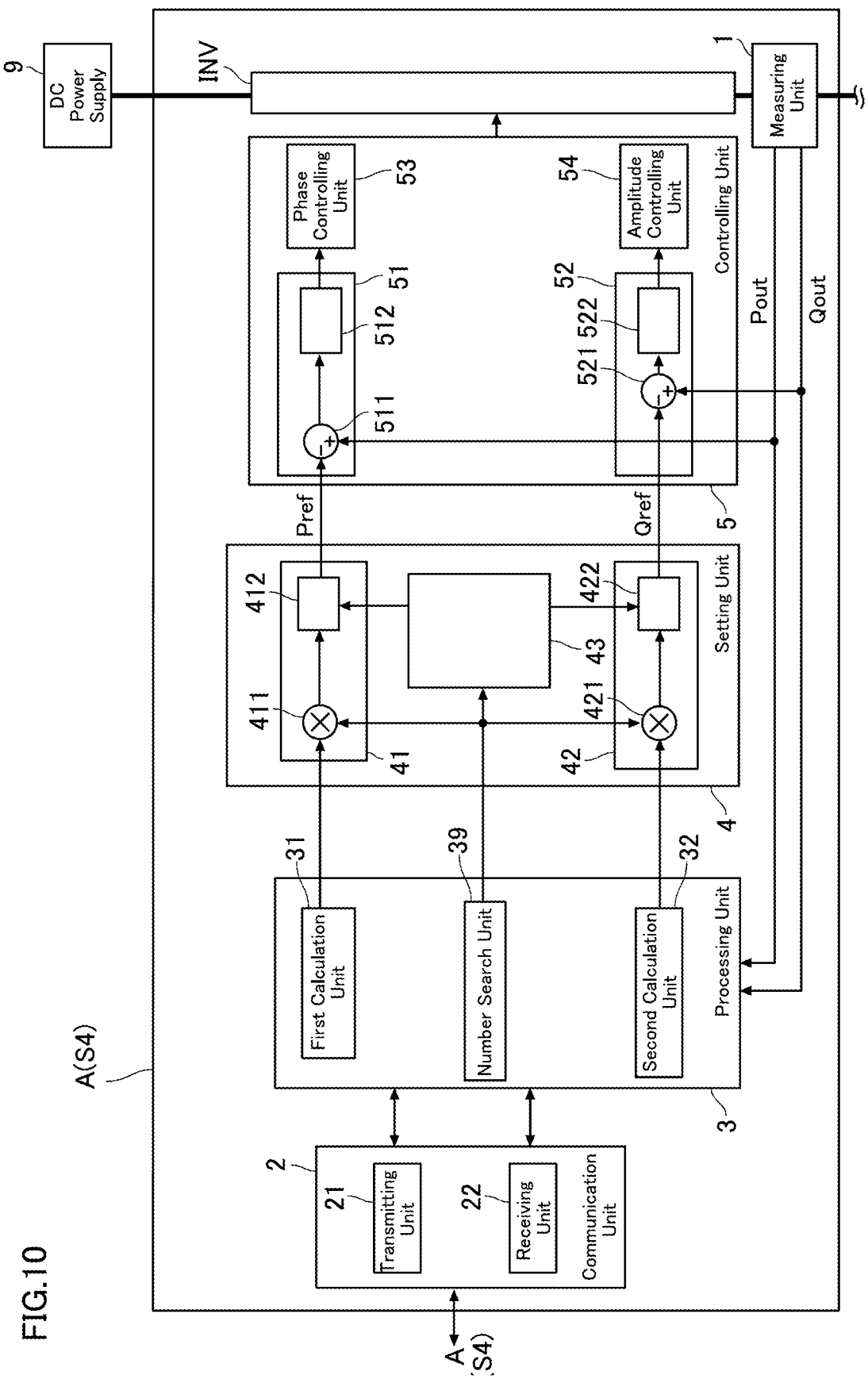
FIG. 10 shows an example of a detailed configuration of the inverter device for the fourth embodiment.

FIG. 10 shows a detailed configuration of each inverter device A. As shown in the figure, each inverter device A includes a measuring unit 1, a communication unit 2, a processing unit 3, a setting unit 4, a controlling unit 5, and an inverter circuit INV.

The measuring unit 1 measures the effective power output value and reactive power output value from the inverter device A as an effective power measurement value Pout and a reactive power measurement value Qout. The measuring unit 1 then outputs the effective power measurement value Pout and the reactive power measurement value Qout to the processing unit 3 and the controlling unit 5.

The communication unit 2 communicates with other inverter devices A. The communication method may be wireless communication or wired communication. The communication unit 2 includes a transmitting unit 21 and a receiving unit 22. The transmitting unit 21 transmits an internal value (described later) to another communication-capable inverter device A. The transmitting unit 21 receives the input of an internal value from the processing unit 3. The receiving unit 22 receives the internal value from another communication-capable inverter device A. The receiving unit 22 outputs the received internal value to the processing unit 3.

The processing unit 3 calculates a state value(s) indicative of electrical and/or physical states of the power system S4. The state value is for each of the relevant inverter devices A to perform distributed and cooperative self-sustaining operation control. In the illustrated example, the state values calculated by the processing unit 3 may be the average value of the effective power output (effective power average value) and the average value of the reactive power output (reactive power average value) of each inverter device A, and may also include the total number of the inverter devices A. The processing unit 3 generates an internal value of the inverter device A in order to work out a state value. The processing unit 3 transmits the generated internal value to another inverter device via the transmitting unit 21. Further, the processing unit 3 receives internal values transmitted from the other inverter devices A via the receiving unit 22. The processing unit 3 performs the calculation based on the following equation or formula (1) with the generated internal value Xi and each received internal value Xj, whereby a new internal value Xi is generated. The internal value Xi is an internal value generated by the own device (that is, the i-th inverter device A), where i is a natural number from 1 to n. The internal value Xj is an internal value received from the j-th inverter device A among the other inverter devices A, where j is a natural number from 1 to n−1. The coefficient ε is a value that satisfies 0<ε<1/dmax, where dmax is the number of the internal values Xj received by the receiving unit 22 of a particular inverter device A, among all the inverter devices A, that is in communication with the greatest number of other inverter devices A. The coefficient ε is used to suppress the fluctuation of the internal value Xi from becoming too large. When the processing in the processing unit 3 is of continuous time processing, multiplication by the coefficient ε is not necessary. The coefficient α is set to "1" or "0". Specifically, the coefficient α is set to "1" for the internal value Xj received by the receiving unit 22, and the coefficient α is set to "0" for the internal value Xj not received. The processing unit 3 repeatedly performs the calculation process in accordance with the following equation (1). As a result of the repetition in each inverter device A, the internal value Xi and the internal value Xj will converge to the arithmetic mean value of the initial internal values Xi generated by each inverter device A (for this, refer to the disclosure of Patent Document 2). In this embodiment, the internal values may include: an effective power internal value based on an effective power output; a reactive power internal value based on a reactive power output; and a number search internal value for determining the total number of the inverter devices A. The processing unit 3 includes a first calculation unit 31, a second calculation unit 32, and a number search unit 39.

$$X_i(k+1) = X_i(k) + \varepsilon \Sigma_j \alpha_{ij}(X_j(k) - X_i(k)) \quad (1)$$

The first calculation unit 31 calculates an effective power average value by repeating the calculation process (first calculation process) for generating effective power internal values. The first calculation unit 31 sets an initial value of the effective power internal value based on the effective power measurement value Pout inputted from the measuring unit 1. This initial value is updated when the effective power measurement value in the measuring unit 1 is updated. In an inverter device A in which the effective power measurement value is updated, the difference between the updated effective power measurement value Pout(t) and the previous effective power measurement value Pout (t−1) is calculated, and this difference is added to the effective power internal value Pi. Thus, the effective power internal value becomes an updated value or updated initial value. In the first calculation process, the first calculation unit 31 calculates a new effective power internal value Pi. This calculation is performed in accordance with calculation results using the generated effective power internal value Pi and each effective power internal value Pj inputted from the receiving unit 22. Specifically, the first calculation process is performed using the above equation (1), where the effective power internal value Pi is used as the internal value Xi, and the effective power internal value Pj is used as the internal value Xj. The newly generated effective power internal value Pi is output to the transmitting unit 21, while being also used for the next first calculation process. By repeating the first calculation process in this manner, the effective power internal value will converge to the arithmetic mean value of the effective power outputs of the respective inverter devices A. The first calculation unit 31 outputs the converged effective power internal value as an effective power average value to the setting unit 4.

The second calculation unit 32 calculates a reactive power average value by repeating a calculation process (second calculation process) for generating the reactive power internal value. The second calculation unit 32 sets an initial value of the reactive power internal value by using the reactive power measurement value Qout inputted from the measuring unit 1. This initial value is updated when the reactive power measurement value in the measuring unit 1 is updated. In an inverter device A in which the reactive power measurement value is updated, the difference between the updated reactive power measurement value Qout(t) and the previous reactive power measurement value Qout (t−1) is calculated, and this difference is added to the reactive power internal value Qi. As a result, the reactive power internal value becomes an updated value or updated initial value. In the second calculation process, the second calculation unit 32 calculates a new reactive power internal value Qi. This calculation is performed using the calculation results based on the generated reactive power internal value Qi and each reactive power internal value Qj inputted from the receiving unit 22. For instance, the second calculation process is performed using the above equation (1), with the reactive power internal value Qi being used as the internal value Xi and with the reactive power internal value Qj being used as the internal value Xj. The newly generated reactive power internal value Qi is output to the transmitting unit 21 and used for the next second calculation process. By repeating the second calculation process, the reactive power internal value will converge to the arithmetic mean value of the reactive power outputs of the respective inverter devices A. The second calculation unit 32 outputs the converged reactive power internal value to the setting unit 4 as a reactive power average value.

The number search unit 39 repeats a calculation process (number search process) for generating a number search internal value. As a result, the number of all relevant inverter devices A is determined. The number search unit 39 sets the initial value of the number search internal value to, for example, "0" or "1" depending on a predetermined condition. For instance, the initial value of the number search internal value is basically "0", but for a particular inverter device A among the plurality of inverter devices A, the initial value may be set to "1". It may be determined as appropriate which inverter device A will have an initial value of "1" regarding the number search internal value. In an example, the number search unit 39 obtains an initial value of "0" (or "1"), for example at the time of system startup of the power system S4, or at the time of transition from grid interconnection operation to self-sustaining operation (at the start of self-sustaining operation). In the number search process, the number search unit 39 will calculate a new number search internal value using the calculation results based on the worked-out number search internal value and each number search internal value inputted from the receiving unit 22. For instance, the number search process may be performed based on the above-noted equation (1), with the number search internal value generated by the number search unit 39 being used as the internal value Xi, and with each number search internal value received by the receiving unit 22 as the internal value Xj. The thus generated new number search internal value is output to the transmitting unit 21, while also being used for the next number search process. By repeating the number search process, the number search internal value converges to 1/n or the reciprocal of the number n of all the inverter devices A. In this way, the number search unit 39 calculates the reciprocal of the number search internal value as the number of the inverter devices A. For more information regarding the workings of how the number of the inverter devices A is determined in the above-noted way, refer to the disclosure of Patent document 3. The number search unit 39 outputs the determined number n of the searched inverter devices A to the setting unit 4. The number search unit 39 may store the information of the number n in a storage unit, or may perform an updated number search at predetermined timings.

The setting unit 4 sets a target value of the effective power output and a target value of the reactive power output in each inverter device A. The setting unit 4 includes a first setting unit 41, a second setting unit 42, and a distribution rate calculating unit 43.

The distribution rate calculating unit 43 calculates a distribution rate for each inverter device A. The distribution rate calculating unit 43 may calculate the reciprocal 1/n of the total number n of the inverter devices A as the distribution rate of each inverter device A. Information on the number n of the inverter devices A is input from the number search unit 39. The distribution rate calculating unit 43 outputs the obtained distribution rate to the first setting unit 41 and the second setting unit 42.

The first setting unit 41 sets a target value of the effective power output (effective power target value Pref) by using the effective power average value inputted from the first calculation unit 31. As shown in FIG. 10, the first setting unit 41 includes a multiplier 411 and a distribution unit 412. The multiplier 411 multiplies the effective power average value by the number n of the inverter devices A inputted from the number search unit 39, thereby working out the total value of the effective power (effective power total value) of the respective inverter devices A. The distribution unit 412 distributes or divides the effective power total value (the multiplication result from the multiplier 411) in accordance with the distribution rate inputted from the distribution rate calculating unit 43. Thus, a portion of the effective power total value is allotted to the respective inverter devices A. In the illustrated embodiment, the distribution rate is the reciprocal 1/n of the total number n of the inverter devices A. Accordingly, the distribution unit 412 evenly distributes the effective power total value to each inverter device A. The first setting unit 41 sets the output result (distribution rate) from the distribution unit 412 as an effective power target value Pref, and outputs this effective power target value Pref to the controlling unit 5.

The second setting unit 42 sets a target value of the reactive power output (reactive power target value Qref) by using the reactive power average value inputted from the second calculation unit 32. As shown in FIG. 10, the second setting unit 42 includes a multiplier 421 and a distribution unit 422. The multiplier 421 multiplies the reactive power average value by the total number n of the inverter devices A inputted from the number search unit 39, thereby working out the total of the reactive power outputs of the respective inverter devices A (reactive power total value). The distribution unit 422 distributes or divides the reactive power total value (multiplication result from the multiplier 421) to each inverter device A in accordance with the distribution rate inputted from the distribution rate calculating unit 43. In the illustrated embodiment, the distribution rate is the reciprocal 1/n of the total number n of the inverter devices A. Thus, the distribution unit 422 evenly distributes the effective power total value to each inverter device A. The second setting unit 42 sets the resulting output (distribution result) from the distribution unit 422 as the reactive power target value Qref, and outputs thus obtained reactive power target value Qref to the controlling unit 5.

The controlling unit 5 controls the output power of the inverter circuit INV based on the effective power measurement value Pout and the effective power target value Pref, and also on the reactive power measurement value Qout and reactive power target value Qref. The inverter circuit INV is arranged between the DC power supply 9 and the measuring unit 1, and converts the DC power inputted from the DC power supply 9 into suitable power. The controlling unit 5 includes a first calculation unit 51, a second calculation unit 52, a phase controlling unit 53 and an amplitude controlling unit 54.

The first calculation unit 51 receives inputs of an effective power measurement value and an effective power target value and works out a voltage phase command value. As shown in FIG. 10, the first calculation unit 51 includes a differentiator 511 and a controller 512. The differentiator 511 receives inputs of an effective power target value and an effective power measurement value, and calculates a deviation or variation $\Delta P$ thereof. The controller 512 calculates a voltage phase command value for making the deviation $\Delta P$ zero. The controller 512 may perform, for example, proportional control (P control), PI control, or PID control. The first calculation unit 51 outputs the resulting voltage phase command value (output from the controller 512) to the phase controlling un differentiator it 53.

The second calculation unit 52 receives inputs of the reactive power measurement value and the reactive power target value, and works out a voltage amplitude command value. As shown in FIG. 10, the second calculation unit 52 includes a differentiator 521 and a controller 522. The differentiator 521 receives inputs of the reactive power target value and the reactive power measurement value, and works out a deviation or variation $\Delta Q$ thereof. The controller 522 calculates a voltage amplitude command value for making the deviation $\Delta Q$ zero. The controller 522 may perform, for example, proportional control (P control), PI control or PID control. The second calculation unit 52 outputs the resulting voltage amplitude command value (output from the controller 522) to the amplitude controlling unit 54.

The phase controlling unit 53 controls the phase of the output voltage based on the voltage phase command value. When the voltage phase command value is the target value of the phase of the output voltage, the phase controlling unit 53 will equalize the phase of the output voltage to the voltage phase command value. Alternatively, when the voltage phase command value is an adjustment value for the phase of the output voltage, the phase controlling unit 53 adjusts the phase of the output voltage from the current value by the amount indicated by the voltage phase command value.

The amplitude controlling unit 54 controls the amplitude of the output voltage based on the voltage amplitude command value. When the voltage amplitude command value is the target value of the amplitude of the output voltage, the amplitude controlling unit 54 will equalize the amplitude of the output voltage to the voltage amplitude command value. Alternatively, when the voltage amplitude command value is an adjustment value for the amplitude of the output voltage, the amplitude controlling unit 54 adjusts the amplitude of the output voltage from the current value by the amount indicated by the voltage amplitude command value.

In the power system S4, the first calculation unit 31 of each inverter device A calculates the average value of the effective power outputs measured by the respective inverter devices A. Then, the first setting unit 41 sets an effective power target value using the obtained effective power average value. In the illustrated embodiment, the value obtained by evenly distributing the total of the respective effective power outputs of the inverter devices A (effective power target value) is set as the effective power target value for each inverter device A. Likewise, the second calculation unit 32 calculates the average value of the respective reactive power outputs measured by the inverter devices A. Then, the second setting unit 42 sets a reactive power target value using the reactive power average value. In the illustrated embodiment, the value obtained by evenly distributing the total of the respective reactive power outputs of the inverter devices A (reactive power output average) is set as the reactive power target value for each inverter device A. With this configuration, the output power (effective power and reactive power) of each inverter device A can be equalized among the inverter devices A, whereby all the inverter devices A can be controlled to have the same operation. Thus, with the power system S4 even when all the respective inverter devices A may be provided by voltage-type inverter devices, it is possible to suppress the phase difference and the potential difference (amplitude difference) among the inverter devices A. The effective power wrap-around is caused by the phase variation of output voltages of the inverter devices A, and the ineffective power wrap-around is caused by the amplitude variation of the output voltages of the inverter devices A. In accordance with the power system S4, since the potential difference and the phase difference between the inverter devices A can be suppressed, unintended power wrap-around can be suppressed for the inverter devices A. As a result, when the inverter devices A are operated in parallel, each inverter device A can perform an appropriate self-sustaining operation in accordance with the total number of the inverter devices A. by the thus configured power system S4, appropriate self-sustaining operation in light of the total number of inverter devices A can be expected, which is advantages to ensuring proper self-sustaining operation of the power system S4.

With the power system S4, the first calculation unit 31 repeats the first calculation process using the effective power internal values, while the second calculation unit 32 repeats the second calculation process using the reactive power internal values. Further, each inverter device A communicates with at least one of the other inverter devices A. Since the communication state involving the respective inverter devices A is a connected state, the effective power internal values and the reactive power internal values of all the respective inverter devices A will converge to an effective power average value and a reactive power average value, respectively. With this configuration, without providing a managing or monitoring device for the plurality of inverter devices A of the power system S4, each inverter device A is capable of calculating an effective power average value and a reactive power average value. Then, each inverter device A controls the output power by setting an effective power target value using the calculated effective power average value while also setting a reactive power target value using the calculated reactive power average value. In this way, the self-sustaining operation of the power system S4 can be properly controlled without relying on a monitoring device in a manner such that the respective inverter devices A are configured to perform output power control in a coordinated and distributed manner. In addition, the power system S4 is so configured that any one of the inverter devices A can communicate with the other inverter devices A without a monitoring device for the purposes of performing output power control in the above-noted coordinated manner even when they are mutually separated. Hence, it is easy to increase or reduce the number of the inverter devices A, which is advantageous to enhancing the expandability of the system.

In a configuration different from the above power system S4, the first setting unit 41 may not include the multiplier 411 and the distribution unit 412, and the effective power average value inputted from the first calculation unit 31 may be set as the effective power target value Pref. Likewise, the second setting unit 42 may not include the multiplier 421 and the distribution unit 422, and may set the reactive power average value inputted from the second calculation unit 32 as the reactive power target value Qref. In the above-described power system S4, during the calculation step of the effective power target value by the first setting unit 41, the effective power average value is multiplied by the number n, and this multiplication result is multiplied by the reciprocal of the number n. Accordingly, the resulting effective power target value will be equal to the effective power average value. Hence, the setting unit 41 of this modified example is capable of setting, without using the information of total number n, the same effective power target value as the one that can be set in the power system S4 described above. The same advantage holds for the calculation step of the reactive power target value by the second setting unit 42. In such a modified example, each inverter device A may not be provided with the number search unit 39 and the distribution rate calculating unit 43.

Further, in a configuration different from the above power system S4, the number search unit 39 may output to the distribution rate calculating unit 43 a number search internal value (1/n) or converged value through repetition of the number search process. In this instance, the distribution rate calculating unit 43 sets the number search internal value inputted from the number search unit 39 as a distribution rate.

Figure 11:
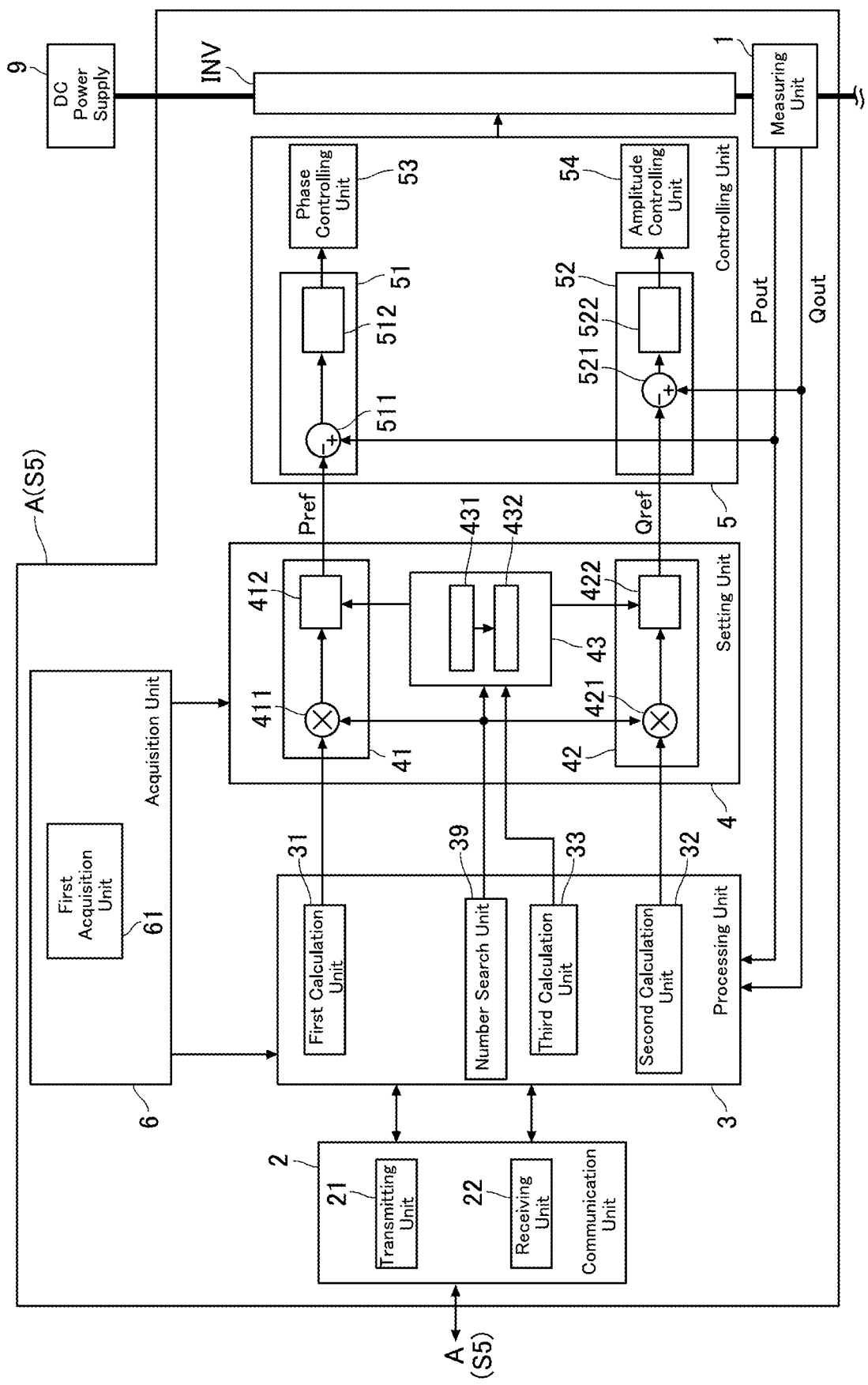
FIG. 11 shows an example of a detailed configuration of an inverter device for a fifth embodiment.

A power system S5 according to a fifth embodiment will be described. FIG. 11 shows a detailed configuration of each inverter device A. The overall configuration and communication connection relationship relating to the power system S5 are the same as the overall configuration (see FIG. 8) and the communication connection relationship (see FIG. 9(a)) of the power system S4. However, the power system S5 differs from the power system S4 in that at least one of the inverter devices A has a different rated capacity than the remaining ones. In other words, the rated capacities of the respective inverter devices A are not the same as a whole.

As shown in FIG. 11, the inverter devices A of the power system S5 differ from those of the power system S4 in the following points. First, each inverter device A is provided with an acquisition unit 6. Second, the processing unit 3 includes an additional or third calculation unit 33. Third, the distribution rate calculating unit 43 calculates a distribution rate in accordance with the rated capacity of each inverter device A.

The acquisition unit 6 includes a first acquisition unit 61. The first acquisition unit 61 acquires the rated capacity of each inverter device A. Information about the rated capacity is stored in, for example, a storage unit which is not shown. The first acquisition unit 61 outputs the acquired rated capacity information to the processing unit 3 and the setting unit 4.

The processing unit 3 of the present embodiment further calculates an average of the rated capacities of the respective inverter devices A (rated capacity average value) as a state value. Further, the processing unit 3 of the present embodiment further works out a rated capacity internal value based on the rated capacity.

The third calculation unit 33 calculates a rated capacity average value by repeating a calculation process (third calculation process) for working out the rated capacity internal value. The third calculation unit 33 sets the rated capacity acquired by the first acquisition unit 61 as an initial value of the rated capacity internal value. In the third calculation process, the third calculation unit 33 works out a new rated capacity internal value, using calculation results based on the generated rated capacity internal value and the rated capacity internal values inputted from the receiving unit 22. In the third calculation process, calculation is performed using the above-noted equation (1) in which the generated rated capacity interval value is used as the internal value Xi, and each rated capacity internal value received by the receiving unit 22 is used as the internal value Xj. The newly generated rated capacity internal value is output to the transmitting unit 21 and also used for the next third calculation process. By repeating the third calculation process, the rated capacity internal value will converge to an arithmetic mean value of the rated capacities of the respective inverter devices A. The third calculation unit 33 outputs the converged rated capacity internal value as a rated capacity average value to the setting unit 4. In accordance with the disclosure, the third calculation unit 33 may store the calculated rated capacity average value in a storage unit, or may calculate an updated rated capacity average value at predetermined timing intervals.

The distribution rate calculating unit 43 of the power system S5 calculates a distribution rate for each inverter device A, where this distribution rate is the ratio of the rated capacity of each inverter device A to the total value of the rated capacities (rated capacity total value) of the respective inverter devices A. The distribution rate calculating unit 43 includes a multiplier 431 and a divider 432. The multiplier 431 multiplies the rated capacity average value inputted from the third calculation unit 33 and the number n inputted from the number search unit 39, thereby working out a total value of the rated capacities of the respective inverter devices A (rated capacity total value). The divider 432 calculates a distribution rate by dividing the rated capacity of the own device inputted from the first acquisition unit 61 by the rated capacity total value (multiplication result from the multiplier 431).

With the power system S5, the distribution rate calculating unit 43 calculates a ratio of the rated capacity of each inverter device A to the total value of the rated capacities of the plurality of inverter devices A as the distribution rate. With this configuration, it is possible to ensure proper output distribution in accordance with the particular rated capacity of each inverter device A among the plurality of inverter devices A having different rated capacities. Thus, in operating a plurality of inverter devices A in parallel, self-sustaining operation can be performed properly in light of the total number of the inverter devices A and the rated capacity of each inverter device A. Hence, the power system S5 is advantageous to performing proper control of the self-sustaining operation of the inverter devices A in accordance with the number of the inverter devices A and the rated capacities of the respective inverter devices A. Further, in the power system S5, similarly to the power system S4, each inverter device A is configured to communicate with any one of the other inverter devices A, whereby the resulting output power can be controlled in a coordinated and distributed manner. Thus, the self-sustaining operation can be controlled without providing a monitoring device for the inverter devices A.

In a configuration different from that of the power system S5, the rated capacities of the respective inverter devices A may all be the same. In this instance, the distribution rate calculated by the distribution rate calculating unit 43 becomes the same as the value calculated by the distribution rate calculating unit 43 of the power system S4 (i.e., the reciprocal 1/n of the number n of the inverter devices A). Accordingly, the output power (effective power and reactive power) of each inverter device A is equalized among the plurality of inverter devices A, whereby the same advantage can be enjoyed as with the power system S4.

In a configuration different from the power system S5, each inverter device A may be configured to calculate an effective power target value without using the information of the number n of the inverter devices A. For example, the first setting unit 41 may be configured, for calculation of the effective power target value, to multiply the effective power average value inputted from the first calculation unit 31 by the rated capacity inputted from the first acquisition unit 61, and then divide the multiplication result by the rated capacity average value inputted from the third calculation unit 33. The same or similar calculation may be performed in the second setting unit 42 for working out the reactive power target value. In the power system S5, on the other hand, the calculation of the effective power target value by the first setting unit 41 includes the step of multiplying the effective power average value by the number n of the inverter devices to work out the effective power total value and, likewise, the step of multiplying the rated capacity average value by the number n of the inverter devices to work out the rated capacity total value. Then, the effective power total value is multiplied by the distribution rate to work out the effective power target value. As seen from the above explanation, the calculation result of the effective power target value is the same regardless of whether the multiplication of the number n is performed or not. In this manner, the first setting unit 41 according to this modification can set the same effective power target value as the power system S5 without using the information relating to the number n. This also holds for the second setting unit 42. Accordingly, in this modification, it is not necessary to provide the number search unit 39 and the distribution rate calculating unit 43.

Figure 12:
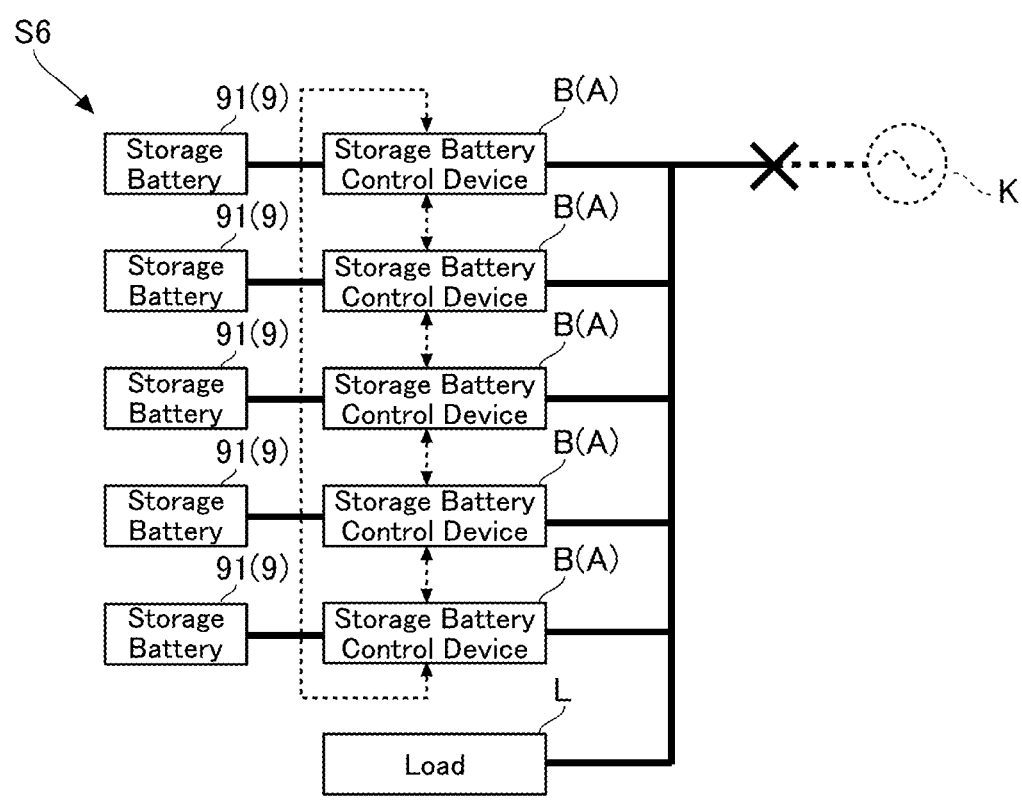
FIG. 12 shows an example of the overall configuration of the power system for a sixth embodiment.

A power system S6 according to a sixth embodiment will be described. FIG. 12 shows an overall configuration of the power system S6. As shown in FIG. 12, the plurality of inverter devices A of the power system S6 include storage battery controlling devices B, respectively. In the example shown in FIG. 12, all of the inverter devices A are storage battery controlling devices B. The storage battery controlling devices B are connected to respective DC power supplies 9, which are storage batteries 91. In the present embodiment, the plurality of storage battery controlling devices B have the same rated capacity, while the plurality of storage batteries 91 have different rated capacities from each other. Hereinafter, the rated capacity of each storage battery 91 is referred to as "storage battery capacity". In the power system S6, each storage battery controlling device B performs distribution of the effective power output according to the storage battery capacity of the connected storage battery 91. Regarding the distribution of the reactive power outputs, for instance, the output may be distributed in accordance with the rated capacity of each storage battery controlling device B.

Figure 13:
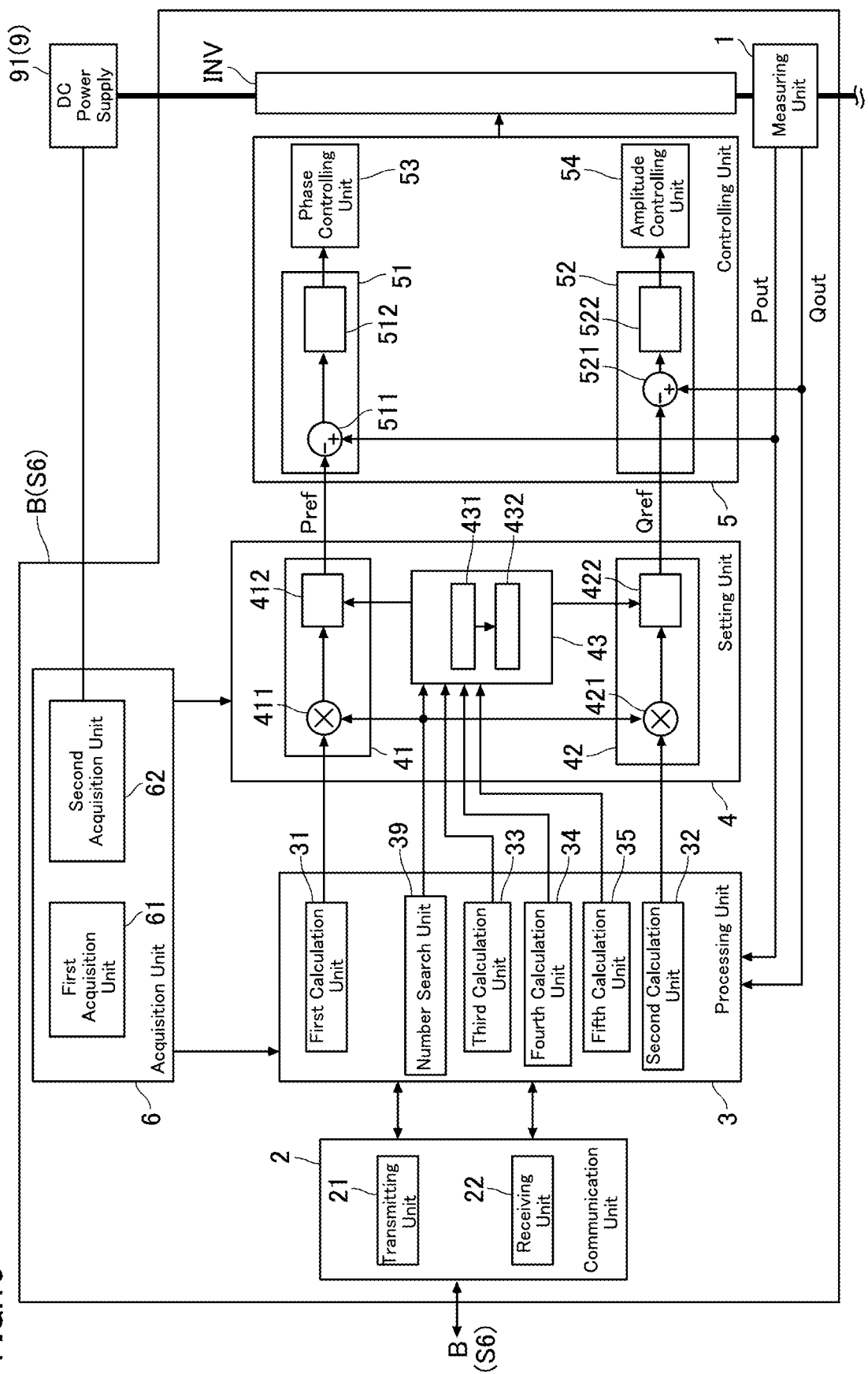
FIG. 13 shows an example of a detailed configuration of a storage batter control unit for the sixth embodiment.

FIG. 13 shows a detailed configuration of each storage battery controlling device B. As shown in FIG. 13, the storage battery controlling device B may include the same components as those of the inverter device A in the fifth embodiment, except that the acquisition unit 6 may further include a second acquisition unit 62. The second acquisition unit 62 is configured to acquire information about the storage battery capacity and charging state or SoC (State of Charge) of the connected storage battery 91. The second acquisition unit 62 outputs the acquired storage battery capacity and SoC to the processing unit 3 and also to the setting unit 4.

The processing unit 3 of the storage battery controlling device B further works out, as state values, an average value of storage battery capacities (storage battery capacity average value) of the storage batteries 91 connected to the respective storage battery controlling devices B and an average value of the SoCs (SoC average value) of the same storage batteries. Further, the processing unit 3 of the storage battery controlling device B works out, as internal values, a storage battery capacity internal value based on the storage battery capacity and an SoC internal value based on the SoC. Thus, the internal values of the power system S6 further include a storage battery capacity internal value and an SoC internal value.

The fourth calculation unit 34 repeats the calculation process (fourth calculation process) for generating the storage battery capacity internal value. As a result, a storage battery capacity average value is calculated. The fourth calculation unit 34 sets the storage battery capacity acquired by the second acquisition unit 62 as an initial value of the storage battery capacity internal value. In the fourth calculation process, the fourth calculation unit 34 uses calculation results that are based on the generated storage battery capacity internal value and the respective storage battery capacity internal values inputted from the receiving unit 22, thereby working out a new storage battery capacity internal value. In the fourth calculation process, the above-noted equation (1) is used, with the generated storage battery capacity internal value being used as the internal value Xi and with each storage battery capacity internal value received by the receiving unit 22 being used as the internal value Xj. The newly generated storage battery capacity internal value is output to the transmitting unit 21, while also being used for the next fourth calculation process. While the fourth calculation process is repeatedly performed in this manner, the storage battery capacity internal value will converge to the arithmetic mean value of the rated capacities of the respective storage batteries 91 connected to the storage battery controlling devices B. The fourth calculation unit 34 outputs the converged storage battery capacity internal value, as a storage battery capacity average value, to the setting unit 4. The fourth calculation unit 34 may store the storage battery capacity average value in a storage unit, or may update the storage battery capacity average value at predetermined timing intervals.

The fifth calculation unit 35 repeats a calculation process (fifth calculation process) for working out a SoC internal value, thereby calculating a SoC average value. The fifth calculation unit 35 sets the SoC acquired by the second acquisition unit 62 as an initial value of the SoC internal value. In the fifth calculation process, the fifth calculation unit 35 works out a new SoC internal value by using the calculation results based on the generated SoC internal value and the respective SoC internal values inputted from the receiving unit 22. In the fifth calculation process, calculation is performed, using the above-noted equation (1) with the generated storage battery capacity internal value being used as the internal value Xi, and with the SoC internal values received by the receiving unit 22 being used as the internal value Xj. The newly generated SoC internal value is output to the transmitting unit 21, while also being used for the next fifth calculation process. By repeating the fifth calculation process in this manner, the SoC internal value will converge to the arithmetic mean value of the SoCs of the respective storage batteries 91 connected to the storage battery controlling devices B. The fifth calculation unit 35 outputs the converged SoC internal value, as a SoC average value, to the setting unit 4. The fifth calculation unit 35 may store the SoC average value in a storage unit, or may perform the calculation of the SoC average value at predetermined timing intervals.

The distribution rate calculating unit 43 of the power system S6 calculates a distribution rate (first distribution rate) outputted to the first setting unit 41 and a distribution rate (second distribution rate) outputted to the second setting unit 42. The second distribution rate is the same as the distribution rate of the power system S5, that is, a distribution rate in accordance with the rated capacity. For calculation of the first distribution rate, the distribution rate calculating unit 43 calculates the ratio of the storage battery capacity of each storage battery controlling device B to the total value of the storage battery capacities of the respective storage battery controlling devices B (storage battery capacity total value), and this calculated ratio is used as the first distribution rate. More specifically, the multiplier 431 multiplies the storage battery capacity average value inputted from the fourth calculation unit 34 by the number n inputted from the number search unit 39, thereby working out the total value of the storage battery capacitors of the respective storage battery controlling devices B (storage battery capacity total value). The divider 432 divides the storage battery capacity of the storage battery connected to the own device, which capacity is input from the second acquisition unit 62, by the storage battery capacity total value (multiplication result by the multiplier 431), thereby working out the first distribution rate.

As shown in FIG. 13, the first setting unit 41 of the power system S6 includes a multiplier 411, a distribution unit 412, and a correction unit 413. The processing executed by the multiplier 411 and the distribution unit 412 is the same as that performed in the power system S4 or S5. The correction unit 413 corrects the output from the distribution unit 412 by the difference between the SoC average value and the SoC of each storage battery 91. In other words, the effective power target value is corrected by the difference between the average value of the SoCs of the storage battery 91 and the SoC of the particular storage battery 91. The first setting unit 41 outputs the effective power target value corrected by the correction unit 413 to the controlling unit 5 (first calculation unit 51).

In the power system S6, the distribution rate calculating unit 43 of each storage battery controlling device B calculates the ratio of the rated capacity of the storage battery 91 to the total value of the rated capacities of the respective storage batteries 91, where the calculated ratio is the distribution rate for the storage battery controlling device B to which the particular storage battery 91 is connected. In the power system S6 having this configuration, it is possible to properly distribute the effective power output in accordance with the storage battery capacity of each storage battery 91 even when the storage battery capacities (i.e., rated capacities of the respective batteries 91) are different. Hence, in operating a plurality of storage battery controlling devices B (i.e., inverter devices A to which storage batteries are connected) in parallel, each storage battery controlling device B can perform appropriate self-sustaining operation in accordance with the total number of the storage battery controlling devices B and with the rated capacity (storage battery capacity) of each storage battery 91. Thus, according to the power system S6, appropriate self-sustaining operation can be controlled in accordance with the total number of storage battery controlling devices B and the rated capacity of each storage battery 91, so that the self-sustaining operation of the power system S6 is improved. Further, in the power system S6, as in the power systems S4 and S5, each storage battery controlling device B communicates with the other storage battery controlling devices B to control the overall output power in a coordinated and distributed manner. Thus, there is no need to provide a monitoring device for managing the storage battery controlling devices B, while proper self-sustaining operation can be controllably performed.

In the power system S6, the first setting unit 41 is configured to correct the effective power target value Pref by the difference between the average value of the SoCs of the respective storage batteries 91 and each SoC. According to this configuration, when there is a difference in the SoCs of the respective storage batteries 91, the SoCs can be averaged, thereby suppressing the bias or undesired variation of the SoCs. In other words, it is possible for the power system S6 to average the SoCs of the storage batteries 91 by causing the power to be intentionally wrapped-around between the inverter devices A (or storage battery controlling devices B).

In a configuration different from the power system S6, each storage battery controlling device B may calculate the effective power target value without using the information of the number n of the plurality of storage battery controlling devices B. For example, the first setting unit 41 of each storage battery controlling device B multiplies the effective power average value inputted from the first calculation unit 31 and the storage battery capacity inputted from the second acquisition unit 62, and then divides the multiplication result by the storage battery capacity average value inputted from the fourth calculation unit 34, thereby working out an effective power target value. In the above-described power system S6, during the calculation step of the effective power target value by the first setting unit 41, the effective power average value is multiplied by the number n to work out the effective power total value, and the storage battery capacity average value is multiplied by the number n to work out the storage battery total capacity. Then, the effective power total value is multiplied by a certain distribution rate to work out the desired effective power target value. In other words, the calculation results for obtaining the effective power target value are the same regardless of whether the multiplication of the number n is performed or not. In the present modification, the first setting unit 41 can set the same effective power target value as the power system S6 without using the information about the number n. In such an instance, the processing unit 3 may not have to include the number search unit 39, and the setting unit 4 may not have to include the distribution rate calculating unit 43.

The power systems and the inverter devices of the present disclosure are not limited to those used for the above-described embodiments. The specific configurations of each part of a power system and an inverter device in accordance with the present disclosure may be freely modified.

The present disclosure includes the embodiments described in the following clauses.

Clause 1.

A power system comprising a plurality of inverter devices configured to supply power to a load, wherein each of the plurality of inverter devices comprises:

a measuring unit configured to measure an effective power output and a reactive power output;

a first calculation unit configured to generate an effective power internal value based on the effective power output and calculate an average value of effective power outputs measured in the respective inverter devices;

a second calculation unit configured to generate a reactive power internal value based on the reactive power output and calculate an average value of reactive power outputs measured in the respective inverter devices;

a first setting unit configured to set an effective power target value using the average value of effective power outputs;

a second setting unit configured to set a reactive power target value using the average value of reactive power outputs;

a controlling unit configured to perform output control based on the measured effective power output, the effective power target value, the measured reactive power output and the reactive power target value; and a communication unit configured to transmit internal values including the generated effective power internal value and the generated reactive power internal value to at least one of remaining inverter devices and also configured to receive an internal value from at least one of the remaining inverter devices, wherein the first calculation unit is configured to perform a first calculation process to generate a new effective power internal value, using calculation results based on the generated effective power internal value and the received effective power internal value, the effective power internal value is configured to converge to an average value of effective power outputs by repetition of the first calculation process, the second calculation unit is configured to perform a second calculation process to generate a new reactive power internal value, using calculation results based on the generated reactive power internal value and the received reactive power internal value, the reactive power internal value is configured to converge to an average value of reactive power outputs by repetition of the second calculation process.

Clause 2.

The power system according to clause 1, further comprising:

a first acquisition unit configured to acquire a rated capacity of an own device; and a third calculation unit configured to generate a rated capacity internal value based on the rated capacity and calculate an average value of rated capacities of the plurality of inverter devices, wherein the internal values comprise the rated capacity interval value, the first setting unit is configured to set the effective power target value using further the average value of rated capacities, the second setting unit is configured to set the reactive power target value using further the average value of rated capacities, the third calculation unit is configured to perform a third calculation process to generate a new rated capacity internal value, using calculation results based on the generated rated capacity internal value and the received rated capacity internal value, the rated capacity internal value is configured to converge to an average value of rated capacities by repletion of the third calculation process.

Clause 3.

The power system according to clause 1 or 2, further comprising:

a number search unit configured to determine a number of the plurality of inverter devices; and a distribution rate calculating unit configured to calculate a distribution rate for an own device, wherein the number search unit is conjured to generate a number search internal value and determine the number of the plurality of inverter devices, using the number search internal value, the first setting unit is configured to: calculate an effective power total value by multiplication of the average value of effective power outputs and the number of the plurality of inverter devices; distribute the effective power total value by the distribution rate; and set a distributed value as the effective power target value, the second setting unit is configured to: calculate a reactive power total value by multiplication of the average value of effective power outputs and the number of the plurality of inverter devices; distribute the effective power total value by the distribution rate; and set a distributed value as the reactive power target value.

Clause 4.

The power system according to any one of clauses 1 to 3, wherein the plurality of inverter devices comprise a plurality of storage battery controlling devices connected to storage batteries, respectively, the plurality of storage battery controlling devices each further comprise:

a second acquisition unit configured to acquire a storage battery capacity and a charge rate of the storage battery connected to an own device;

a fourth calculation unit configured to generate a storage battery capacity internal value based on the storage battery capacity and calculate an average value of storage battery capacities of the plurality of inverter devices; and a fifth calculation unit configured to generate a charge rate internal value based on the charge rate and calculate an average value of charge rates of the storage batteries connected to the plurality of storage battery controlling devices, the internal values further comprise the storage battery capacity internal value and the charge rate internal value, the first setting unit of each storage battery controlling unit is further configured: to calculate the effective power target value, using the rated capacity acquired by the second acquisition unit and the average value of storage battery capacities; correct the calculated effective power target value, using the average value of charge rates and the charge rate acquired by the second acquisition unit; and set the corrected effective power target value as the effective power target value, the fourth calculation unit is configured to perform a fourth calculation process to generate a new storage battery capacity internal value, using calculation results based on the generated storage battery capacity internal value and the received storage battery capacity internal value, the storage battery capacity internal value is configured to converge to an average value of storage battery capacities by repetition of the fourth calculation process, the fifth calculation unit is configured to perform a fifth calculation process to generate a new charge rate internal value, using calculation results based on the generated charge rate internal value and the received charge rate internal value, the charge rate internal value is configured to converge to an average value of charge rates by repetition of the fifth calculation process.

Clause 5.

An inverter device for supplying power to a load in cooperation with at least another inverter device, comprising:

a measuring unit configured to measure an effective power output and a reactive power output;

a first calculation unit configured to generate an effective power internal value based on the effective power output and calculate an average value of effective power outputs measured in inverter devices;

a second calculation unit configured to generate a reactive power internal value based on the reactive power output and calculate an average value of reactive power outputs measured in the inverter devices;

a first setting unit configured to set an effective power target value using the average value of effective power outputs;

a second setting unit configured to set a reactive power target value using the average value of reactive power outputs;

a controlling unit configured to perform output control based on the measured effective power output, the effective power target value, the measured reactive power output and the reactive power target value; and a communication unit configured to transmit internal values including the generated effective power internal value and the generated reactive power internal value to at least one of remaining inverter devices and also configured to receive an internal value from at least one of the remaining inverter devices, wherein the first calculation unit is configured to perform a first calculation process to generate a new effective power internal value, using calculation results based on the generated effective power internal value and the received effective power internal value, the effective power internal value is configured to converge to an average value of effective power outputs by repetition of the first calculation process, the second calculation unit is configured to perform a second calculation process to generate a new reactive power internal value, using calculation results based on the generated reactive power internal value and the received reactive power internal value, the reactive power internal value is configured to converge to an average value of reactive power outputs by repetition of the second calculation process.

The invention claimed is:

1. A monitoring device comprising:
a receiving unit configured to receive an effective power output value and a reactive power output value from each of a plurality of inverter devices;
a setting unit configured to set an effective power target value and a reactive power output value for each of the plurality of inverter devices;
a first calculation unit configured to calculate, upon input of the effective power target value and the effective power output value, a voltage phase command value for each of the plurality of inverter devices;
a second calculation unit configured to calculate, upon input of the reactive power target value and the reactive power output value, a voltage amplitude command value for each of the plurality of inverter devices;
a transmitting unit configured to transmit the voltage phase command value and the voltage amplitude command value to a corresponding inverter device;
a distribution rate calculating unit configured to calculate a distribution rate for each of the plurality of inverter devices; and
a total value calculating unit configured to calculate an effective power total value as a sum of the effective power output values of the respective inverter devices and a reactive power total value as a sum of the reactive power output values of the respective inverter devices,
wherein the setting unit is configured to calculate the effective power target value for each of plurality of the inverter devices, using the effective power total value and a distribution rate for said each of the plurality of inverter devices, and calculate the reactive power target value for each of the plurality of inverter devices, using the reactive power total value and a distribution rate for said each of the plurality of inverter devices.

2. The monitoring device according to claim 1, wherein the distribution rate calculating unit is configured to calculate a reciprocal of a number of the inverter devices as the distribution rate for each of the plurality of inverter devices.

3. The monitoring device according to claim 1, wherein the distribution rate calculating unit is configured to calculate a ratio of a rated capacity of each inverter device to a total value of rated capacities of the inverter devices as the distribution rate for said each inverter device.

4. The monitoring device according to claim 1, wherein the inverter devices comprise storage battery controlling devices connected to storage batteries, respectively, the distribution rate calculating unit is configured to calculate a distribution rate for each storage battery controlling device as a ratio of the rated capacity of the storage battery connected to said each storage battery controlling device to a total value of rated capacities of the respective storage batteries, the receiving unit is configured to receive charge rates of the storage batteries via the storage battery controlling devices, the setting unit is configured to correct, based on a difference between an average value of charge rates of the respective storage batteries and a charge rate of the storage battery connected to one of the storage battery controlling devices, the effective power target value for said one of the storage battery controlling devices.

5. A power system comprising:

a monitoring device in accordance with claim 1; and a plurality of inverter devices, wherein each of the plurality of inverter devices comprises: a controlling unit configured to control output voltage; and a measuring unit configured to measure an effective power output value and a reactive power output value, wherein the controlling unit is configured to control the output voltage based on a voltage phase command value and a voltage amplitude command value both transmitted from the monitoring device.

6. A non-transitory computer-readable storage medium comprising a program configured to cause a computer to operate as:

a receiving unit configured to receive an effective power output value and a reactive power output value from each of a plurality of inverter devices;

a setting unit configured to set an effective power target value and a reactive power target value for each of the plurality of inverter devices;

a first calculation unit configured to calculate, upon input of the effective power target value and the effective power output value, a voltage phase command value for each of the plurality of inverter devices;

a second calculation unit configured to calculate, upon input of the reactive power target value and the reactive power output value, a voltage amplitude command value for each of the plurality of inverter devices;

a transmitting unit configured to transmit the voltage phase command value and the voltage amplitude command value to a corresponding inverter device;

a distribution rate calculating unit configured to calculate a distribution rate for each of the plurality of inverter devices; and a total value calculating unit configured to calculate an effective power total value as a sum of the effective power output values of the respective inverter devices and a reactive power total value as a sum of the reactive power output values of the respective inverter devices, wherein the setting unit is configured to calculate the effective power target value for each of the plurality of inverter devices, using the effective power total value and a distribution rate for said each of the plurality of inverter devices, and calculate the reactive power target value for each of the plurality of inverter devices, using the reactive power total value and a distribution rate for said each of the plurality of inverter devices.

\* \* \* \* \*